(12) United States Patent
Walger et al.

(10) Patent No.: US 11,351,810 B2
(45) Date of Patent: Jun. 7, 2022

(54) SYNTHESIS OF MOVING AND BEATING MOIRÉ SHAPES

(71) Applicants: Thomas Walger, Prilly (CH); Roger D. Hersch, Epalinges (CH); Jürgen Brugger, Vufflens-la-ville (CH)

(72) Inventors: Thomas Walger, Prilly (CH); Roger D. Hersch, Epalinges (CH); Jürgen Brugger, Vufflens-la-ville (CH)

(73) Assignee: Ecole Polytechnique Fédérale de Lausanne (EPFL), Lausanne (CH)

( * ) Notice: Subject to any disclaimer, the term of this patent is extended or adjusted under 35 U.S.C. 154(b) by 2 days.

(21) Appl. No.: 17/016,414

(22) Filed: Sep. 10, 2020

(65) Prior Publication Data

US 2022/0072892 A1 Mar. 10, 2022

(51) Int. Cl.
*B42D 25/342* (2014.01)
*G02B 27/60* (2006.01)

(52) U.S. Cl.
CPC ............ *B42D 25/342* (2014.10); *G02B 27/60* (2013.01)

(58) Field of Classification Search
CPC .............................. B42D 25/342; G02B 27/60
USPC .................... 283/67, 70, 72, 74, 94, 98, 901
See application file for complete search history.

(56) References Cited

U.S. PATENT DOCUMENTS

| | | | |
|---|---|---|---|
| 6,249,588 B1 | 6/2001 | Amidror et al. | |
| 6,819,775 B2 | 11/2004 | Amidror et al. | |
| 7,194,105 B2 | 3/2007 | Hersch et al. | |
| 7,305,105 B2 | 12/2007 | Chosson et al. | |
| 7,333,268 B2 | 2/2008 | Steenblik | |
| 7,710,551 B2 | 5/2010 | Hersch et al. | |
| 7,751,608 B2 | 7/2010 | Hersch et al. | |
| 10,286,716 B2 | 5/2019 | Hersch et al. | |
| 2015/0324657 A1* | 11/2015 | Cho | G06K 9/00201 382/203 |
| 2017/0113481 A1* | 4/2017 | Hersch | B42D 25/435 |

OTHER PUBLICATIONS

T. Walger; T. Besson; V. Flauraud; R. D. Hersch; J. Brugger, "1D moiré shapes by superposed layers of micro-lenses", Optics Express. Dec. 23, 2019, vol. 27, No. 26, p. 37419-37434.
T. Walger; T. Besson; V. Flauraud; R. D. Hersch; J. Brugger, Level-line moirés by superposition of cylindrical microlens gratings, Journal of the Optical Society of America. Jan. 10, 2020. vol. A37, No. 2, p. 209-218.
R.D. Hersch and S. Chosson, Band Moiré Images, Proc. SIGGRAPH 2004, ACM Trans. on Graphics, vol. 23, No. 3, 239-248 (2004).

(Continued)

*Primary Examiner* — Justin V Lewis

(57) ABSTRACT

The present invention proposes a method for producing an authenticable moiré shape that simultaneously moves and shows a beating effect. The method relies on a combination of the 1D or the 2D moiré and the level line moiré. When tilting a compound showing such a moiré, the moiré shape moves, its intensity levels change significantly but its shape remains the same and is recognizable. Embodiments comprise a base layer made of patterned metallic tiny shapes and a revealing layer made of a 1D array of cylindrical lenslets or of a 2D array of spherical or aspherical lenslets.

21 Claims, 20 Drawing Sheets

(56) References Cited

OTHER PUBLICATIONS

S. Chosson, R.D. Hersch, Beating Shapes Relying on Moiré Level Lines, ACM Transactions on Graphics (TOG), vol. 34 No. 1, Article No. 9, 1-10 (2014).
H. Kamal, R. Völkel, J. Alda, Properties of the moiré magnifiers, Optical Engineering, vol. 37, No. 11, pp. 3007-3014 (1998).
I. Amidror, The theory of the moiré phenomenon, 2nd edition, vol. 1, Section 4.4, The special case of the (1,0,−1,0)-moiré, pp. 96-108, (2009).
S. Chosson, "Synthèse d'images moiré" (in English: Synthesis of moiré images), EPFL Thesis 3434, 2006, pp. 111-112.
Z. D. Popovic, R. A. Sprague, and G. A. N. Connell, "Technique for monolithic fabrication of microlens arrays," Applied Optics, vol. 27, No. 7, p. 1281, Apr. 1988.
D. Daly, R. F. Stevens, M. C. Hutley, and N. Davies, "The manufacture of microlenses by melting photoresist," Measurement Science and Technology, vol. 1, 759-766 (1990).
U.S. Appl. No. 16/881,396, Hersch.

\* cited by examiner

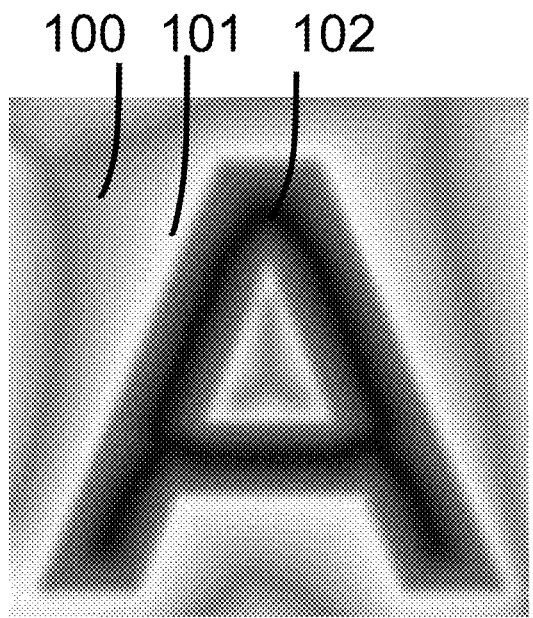
FIG. 1A
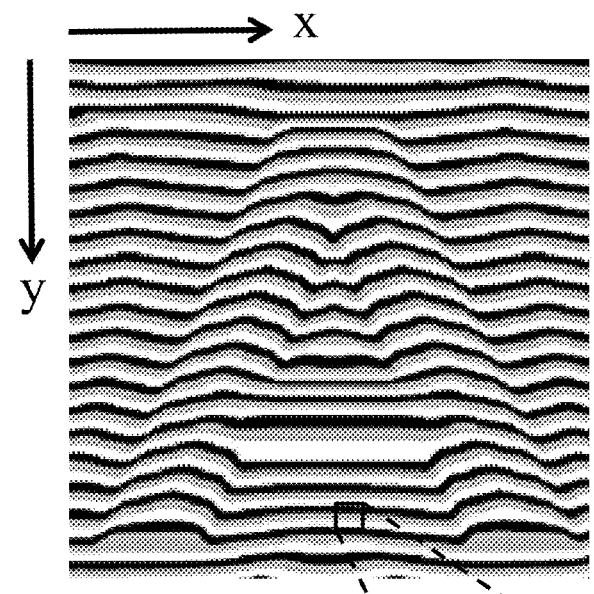
FIG. 1B
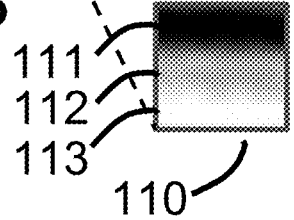
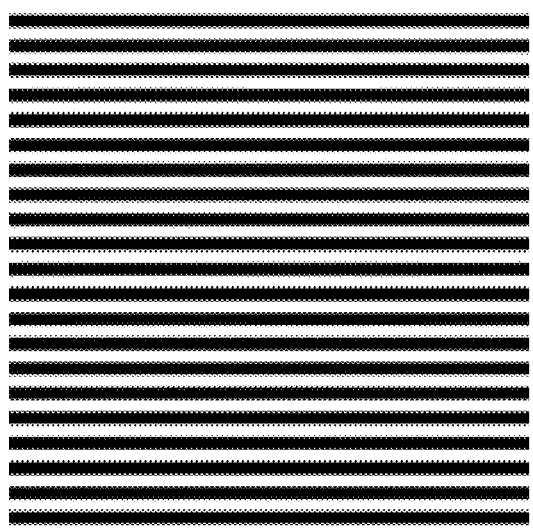
FIG. 1C
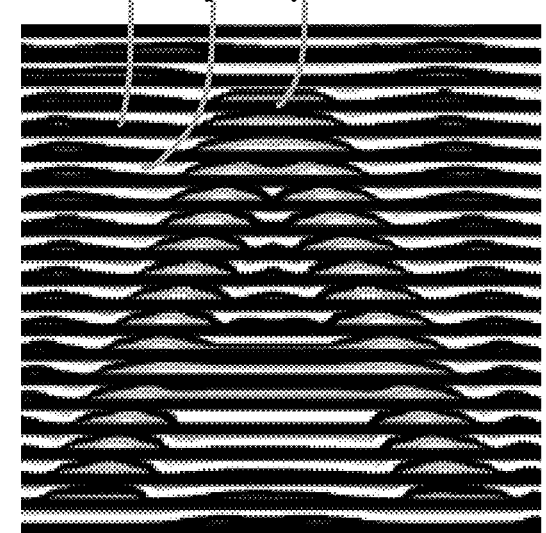
FIG. 1D

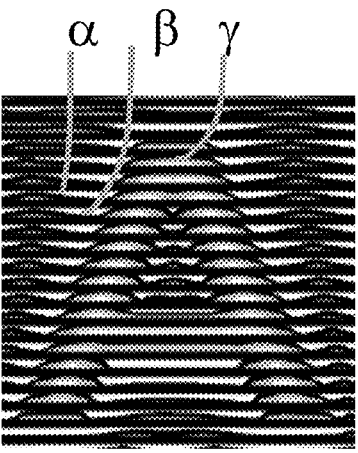
FIG. 2A  Φ=0.11
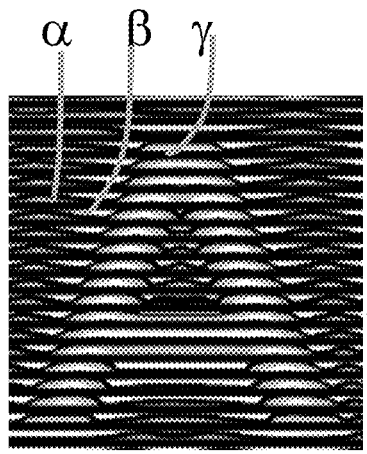
FIG. 2B  Φ=0.21
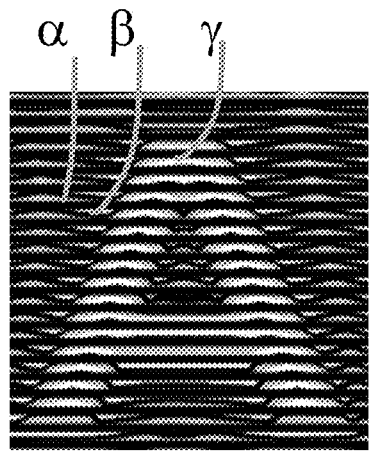
FIG. 2C  Φ=0.32
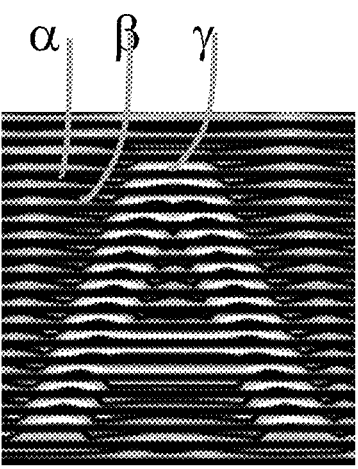
FIG. 2D  Φ=0.42
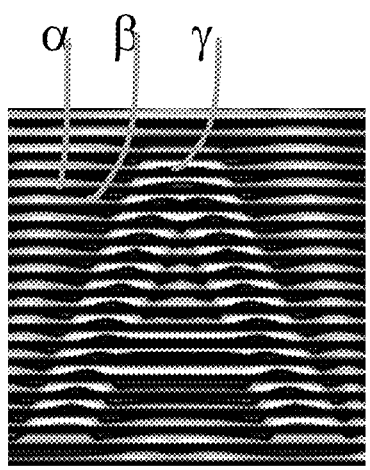
FIG. 2E  Φ=0.53
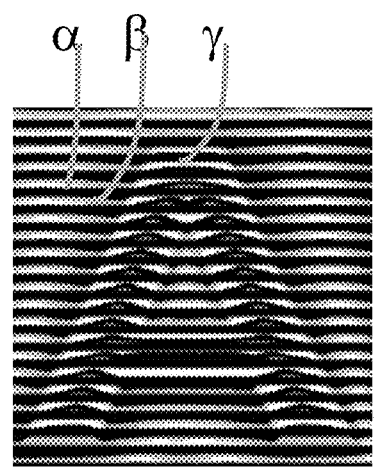
FIG. 2F  Φ=0.63
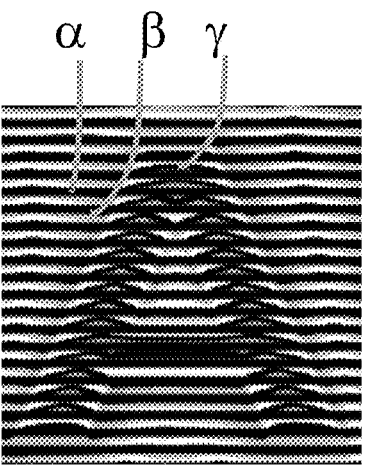
FIG. 2G  Φ=0.74
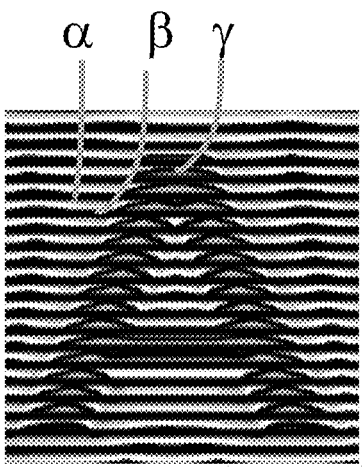
FIG. 2H  Φ=0.84
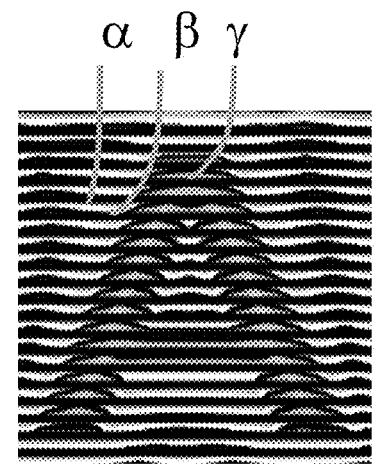
FIG. 2J  Φ=0.95

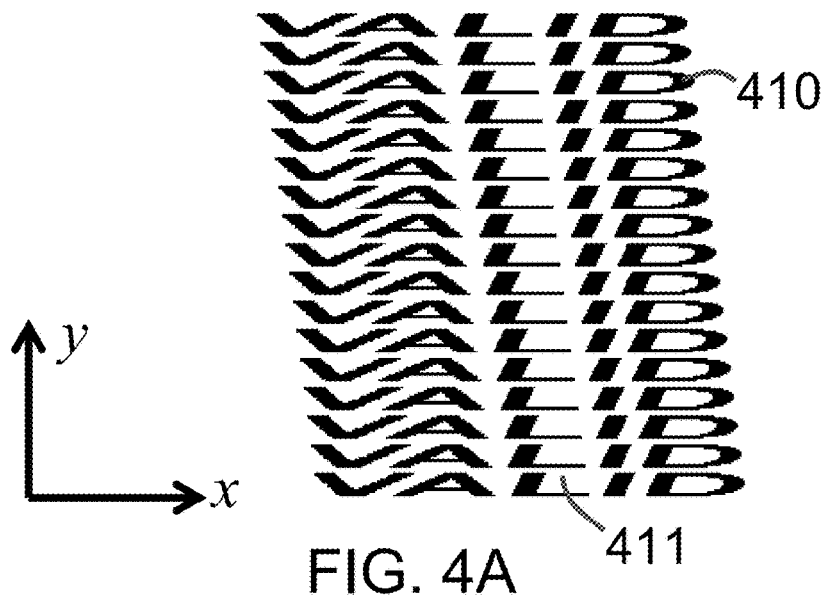
FIG. 4A
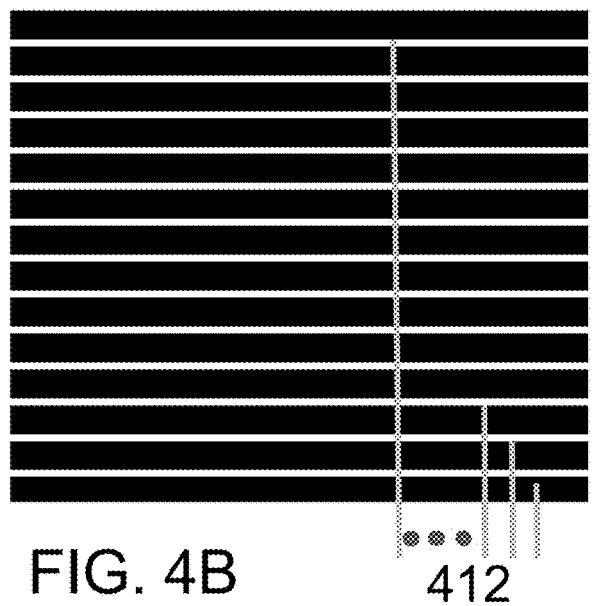
FIG. 4B
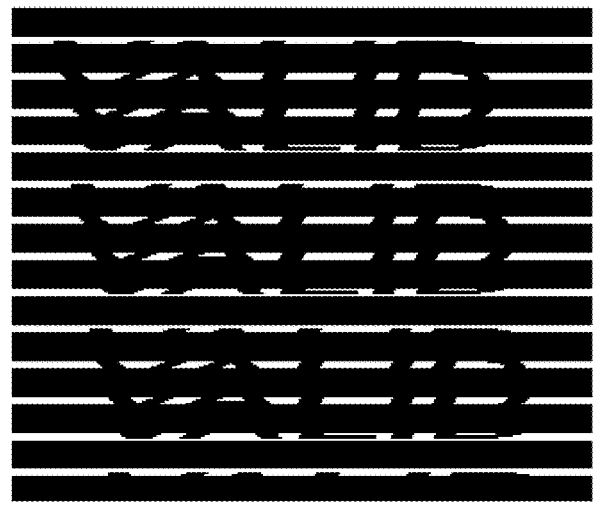
FIG. 4C  Φ=0

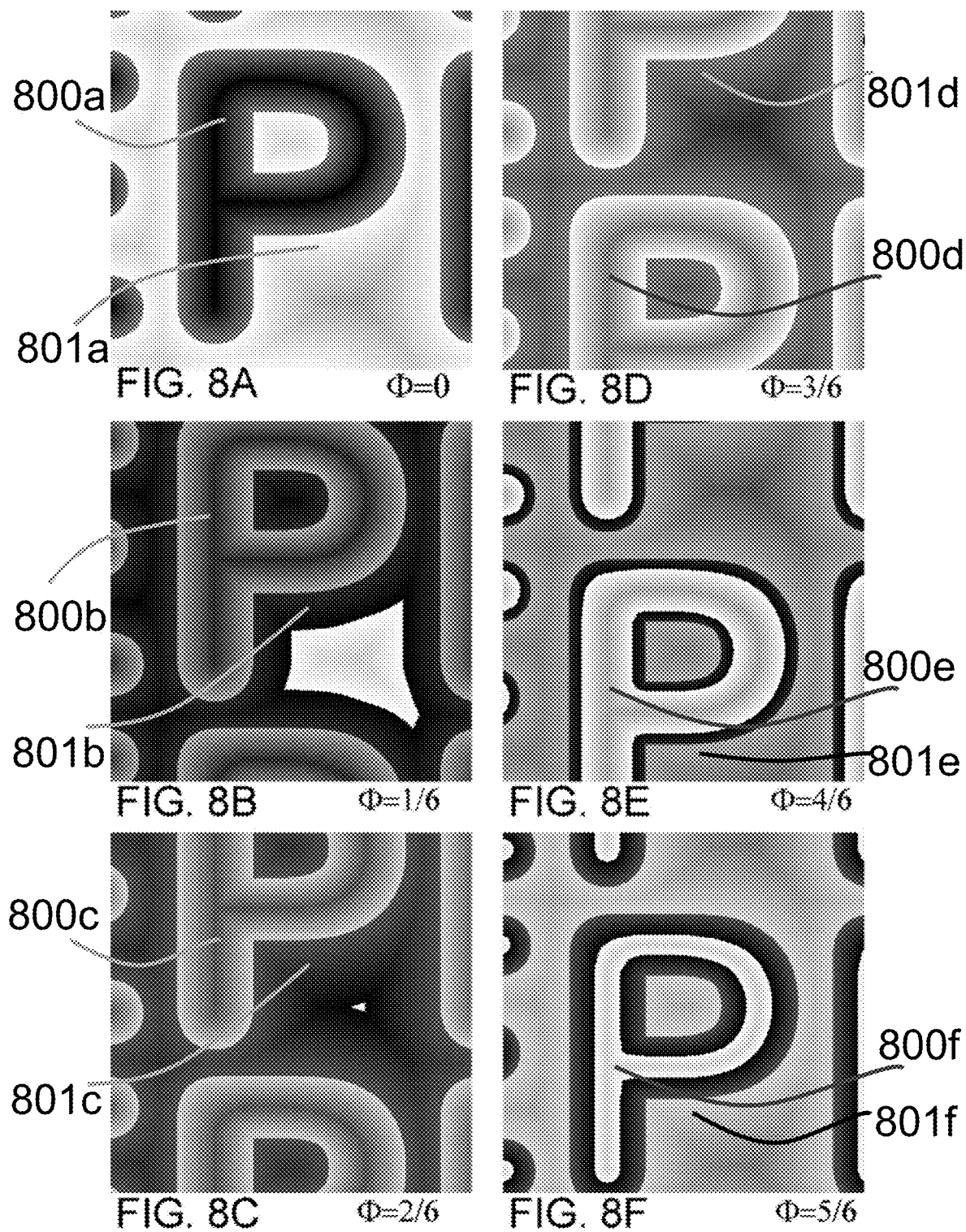

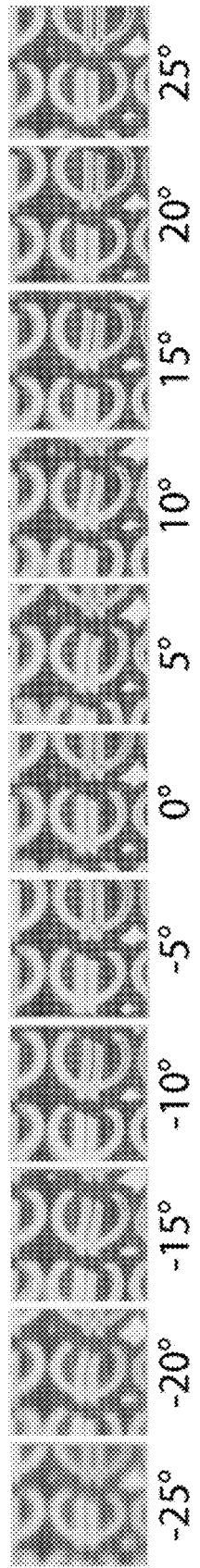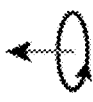
FIG 16A
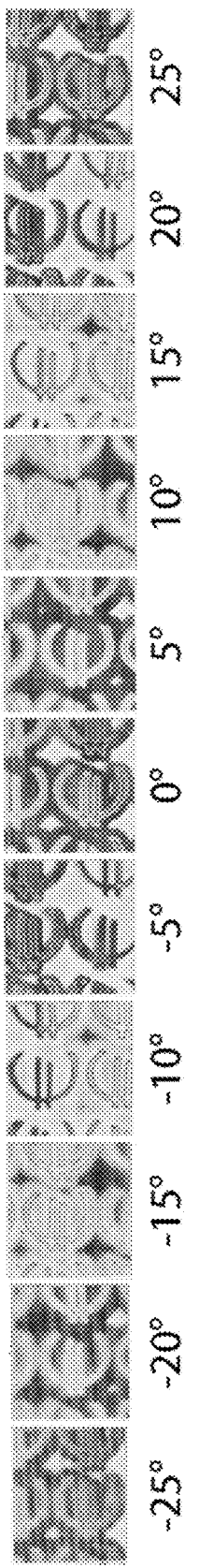
FIG 16B

SYNTHESIS OF MOVING AND BEATING MOIRÉ SHAPES

The present invention is related to the following US patents:

(a) U.S. Pat. No. 7,194,105, filed Oct. 16, 2002, entitled "Authentication of documents and articles by moiré patterns", inventors Hersch and Chosson, (category: 1D moiré);

(b) U.S. Pat. No. 7,751,608, filed 30th of Jun., 2004 entitled "Model-based synthesis of band moiré images for authenticating security documents and valuable products", inventors Hersch and Chosson (category: 1D moiré);

(c) U.S. Pat. No. 7,710,551, filed Feb. 9, 2006, entitled "Model-based synthesis of band moiré images for authentication purposes", inventors Hersch and Chosson (category: 1D moiré);

(d) U.S. Pat. No. 7,305,105 filed Jun. 10, 2005, entitled "Authentication of secure items by shape level lines", inventors Chosson and Hersch (category: level-line moiré), herein incorporated by reference;

(e) U.S. Pat. No. 6,249,588 filed Aug. 28, 1995, entitled "Method and apparatus for authentication of documents by using the intensity profile of moiré patterns", inventors Amidror and Hersch (category 2D moiré);

(f) U.S. Pat. No. 6,819,775, filed Jun. 11, 2001, entitled "Authentication of documents and valuable articles by using moiré intensity profiles", inventors Amidror and Hersch (category 2D moiré);

(g) U.S. Pat. No. 10,286,716, filed Oct. 27, 2015 entitled "Synthesis of superposition shape images by light interacting with layers of lenslets" inventors Hersch, Walger, Besson, Flauraud, Brugger (different categories of moirés, all in transmission mode), herein incorporated by reference;

(h) U.S. patent application Ser. No. 16/881,396, filed 22 May 2020, entitled: "Synthesis of curved surface moiré", inventor Hersch (different categories of moiré, laid out on curved surfaces);

In patents (a) to (i) inventor Hersch is also inventor in the present patent application. References from the scientific literature are given at the end of the present document.

BACKGROUND OF THE INVENTION

The related patents cited above provide authentication methods and devices for preventing counterfeits of both security documents and valuable articles and at the same time offer means for increasing their attractiveness and aesthetics. These patents describe the following families of moirés: 1D moirés, 2D moirés and level-line moirés. The 1D and 2D moirés are characterized by having moiré shapes that move. In the case of the 1D moiré, the moiré shapes move only in one dimension. In the case of the 2D moiré, the moiré shapes move along two dimensions. The level-line moiré does not produce a moving moiré shape but rather produces a beating effect within the moiré shape.

In the present invention, we disclose methods to combine the movement of the 1D or 2D moiré and the beating effect present in the level-line moiré. Combining these two effects requires the synthesis of very fine geometric structures laid out at specific angular relationships. They therefore ensure a very high protection against counterfeits. Let us describe in more detail the 1D moiré, 2D moiré and level-line moiré on which we build to create moving and beating moiré shapes.

1D-Moiré techniques (e.g. U.S. Pat. No. 10,286,716)

The 1D-moiré synthesizing methods, also called band moiré image synthesizing methods are characterized by equations that relate a base layer layout comprising an array of base bands (FIG. 3A, 301) made of vertically compressed instances of a 1D moiré image 303, a revealing layer layout comprising a grating of sampling lines (302*a*, 302*b*, 302*c*) and the 1D moiré layout 303 resulting from the superposition of the base and revealing layers. The 1D moiré image shapes are a geometric transformation of the shapes embedded within each band of the base band grating. This geometric transformation comprises always an enlargement in one dimension, and possibly a rotation, a shearing, a mirroring, and/or a bending transformation. 1D-moiré synthesizing methods enable creating a base band grating and a revealing line grating that yield a displacement of the 1D moiré image shapes upon translation or rotation of the sampling positions of the revealing line grating on the base band grating.

Level Line Moiré Synthesizing Techniques (mainly U.S. Pat. No. 7,305,105)

Shape level line moirés occur in a superposition image when a base layer comprising an array of lines locally shifted (FIG. 1B) according to a shape elevation profile (FIG. 1A) is superposed with a sampling revealing layer comprising the unshifted array of lines (FIG. 1C). The layer with the locally shifted array of lines embeds the shape elevation profile generated from an initial, preferably bilevel motif shape image (e.g. typographic characters, words of text, symbols, logos, ornaments). By modifying the relative superposition phase of the sampling revealing array in respect to the base layer (e.g. by a translation), one may observe a shape level line moiré that appears as successions of level lines of the shape elevation profile. This succession of level lines evolves dynamically between the initial motif shape boundaries (shape borders) and shape foreground centers, respectively shape background centers, thereby growing and shrinking. The movement of shape level lines across the motif shape (FIGS. 2A to 2J) creates visually attractive pulsing motif shapes, for example pulsing symbols such as the pulsing letter "A" (FIGS. 2A to 2J). Shape level line techniques have also been published in December 2014, see reference [Chosson and Hersch 2014] at the end of this document.

2D Moiré Techniques 2D moiré techniques are based on the moiré intensity profile that is generated by the superposition of a specially designed 2D base layer array of tiny shapes (FIG. 9, 901) and a revealing layer formed of a 2D array of sampling elements such as transparent dots, spherical microlenses or aspherical microlenses (see U.S. Pat. No. 6,249,588 to Amidror and Hersch, filed Aug. 28, 1995). The base layer consists of an array of tiny shapes, and is characterized by the following parameters: their two repetition periods, their orientations, and their shapes. When the revealing layer is laid on top of the base layer 2D array of tiny shapes, when both of them have been designed in accordance with 2D moiré layout techniques, there appears in the superposition a highly visible repetitive moiré pattern of a predefined intensity profile shape, whose size, location and orientation gradually vary as the revealing layer sampling locations are rotated and/or shifted on top of the base layer array of tiny shapes. This repetitive moiré pattern may comprise letters, digits or other symbols. The base layer array of tiny shapes can be incorporated (or dissimulated) within a variable intensity halftoned image such as a portrait, a landscape, or a decorative motif. Embodiments of 2D moiré techniques include a revealing array of microlenses superposed with an array of base layer tiny shapes formed of the combination of non-reflecting and reflecting structures (e.g. U.S. Pat. No. 6,249,588).

Moiré Shape Synthesizing Techniques

In the prior art of 1D, 2D and level-line moiré techniques, it is assumed that the base layer information is printed or patterned into the base layer along longitudinal 1-dimensional structures such as bands or as 2-dimensional array structures and that a revealing layer is made of a line-oriented 1-dimensional array or respectively of a 2-dimensional array of elements sampling the base layer. This sampling revealing layer is made of a 1D array of cylindrical lenslets (lenticular lenses) in the 1D case or of a 2D array of spherical or aspherical lenslets in the 2D case. In 1D moiré techniques, the base layer comprises the base bands, each base band incorporating a base band shape obtained by a linear or non-linear geometric transformation of the desired 1D moiré shape. In 2D moiré techniques, the base layer comprises juxtaposed areas containing shapes obtained by a linear or non-linear geometric transformation of the desired 2D moiré shape. In level line moiré techniques, the base layer comprises a grating of bands locally shifted in proportion to the elevation profile at the current position. Embodiments include the creation of a compound made of the revealing layer on one side and of the base layer on the other side of a substrate having a given thickness. When tilting this compound, the revealing layer sampling elements sample different parts of the base layer bands and the superposition moiré image evolves dynamically, according to the layouts and periods of the base and revealing layers.

In the present disclosure, in the case of the 1D moving and beating moiré, we propose to form the base layer by bands incorporating tiny shapes whose intensity values gradually evolve at successive locations along their replication direction. The revealing layer remains the same sampling layer as for the 1D moiré, embodied preferably by a grating of cylindrical lenses. In the case of the 2D moving and beating moiré, we form arrays of base layer shapes, whose intensities remain substantially constant in one direction and vary in the other direction. The revealing layer remains the same sampling layer as in the case of the 2D moiré.

SUMMARY OF THE INVENTION

The present invention proposes a method for producing an authenticable moiré shape that simultaneously moves and shows a beating effect. The method relies on a combination of the 1D or 2D moiré and the level line moiré. The corresponding moving and beating moiré moves in one, or in two dimensions, respectively, for example when tilting a compound formed by the superposition of a modified base layer comprising an array of tiny shapes and a revealing layer comprising an array of sampling lenslets. The modified base layer is formed by applying processing operations to the base layer that would be generated to create a pure 1D, respectively 2D moiré. These processing operations consist in performing a modulo-1 addition between the normalized 1D or 2D moiré base layer and a normalized grating of gradients. The resulting modified base layer incorporates the same tiny shapes as in the original base layer, but in addition it incorporates shifts in intensity values. At different positions of the modified base layer, there may be for the same tiny shape a different intensity profile.

The method for synthesizing 1D or 2D level-line moving and beating moirés (1D-LL moiré, 2D-LL moiré) comprises the following steps: —creation of a height map with intensity gradients at the boundaries of the desired moiré shape; —creation of a base elevation profile comprising a grating of replicated base shapes obtained by a linear transformation of the height map; —creation of a modified base by performing operations comprising at each position of the modified base a modulo addition between the base elevation profile and a grating of gradients; —superposing the modified base and a revealing layer formed by a grating of sampling elements; —observing the moiré shape produced by the superposition and for authentication, verifying the presence of both a movement and a beating of the moiré shape.

The beating effect is obtained by intensities that increase modulo the maximal intensity or decrease modulo the minimal intensity when the revealer samples successive locations of the modified base.

In case that the modified base should be bilevel, for example when embodied by flat metallic patterns, a subsequent thresholding or halftoning step is applied to obtain a bilevel modified base. In case of a modified base with metallic patterns, the observation of the moiré is facilitated when the incident light is specularly reflected by the modified base.

For the 1D-LL moiré, the sampling revealing layer can be embodied by a grating of transparent lines, or preferably by a grating of cylindrical lenslets. For the 2D-LL moiré, the revealing layer is embodied by an array of transparent dots or preferably by an array of spherical or aspherical lenslets.

In a concrete embodiment, a compound is formed by the superposition of the modified base and of the revealing layer by having on one side of the compound the revealing layer and on the other side the modified base layer and where the moving and beating moiré shape is observed by tilting the compound. A further verification of the authenticity of a document or article incorporating the compound consists in verifying that similar elements of the moiré shape have at a given tilt angle similar intensities.

The 1D-LL moving and beating moiré is characterized by a moiré shape that moves only along a single dimension, and by a base elevation profile made of a grating of tiny shapes replicated in one dimension. This grating of tiny shapes is obtained from the height map by a linear transformation comprising a downscaling operation. The corresponding moving and beating moiré is revealed by a 1D array of cylindrical lenses.

The 2D-LL moving and beating moiré is characterized by a moiré shape that has the properties of a 2D moiré which moves along two dimensions and by a base elevation profile made of a grating of shapes replicated in one or two dimensions. This grating of shapes is obtained from the height map by a linear transformation that comprises a downscaling and possibly a rotation operation. The movement of the moiré along one dimension does not create a beating effect and the movement of the moiré in the other dimension creates the beating effect.

In a concrete embodiment, a compound useful for the authentication of documents and goods is made of a superposition of a modified base layer and of a revealing layer. The modified base layer is formed by an array of tiny shapes and the revealing layer by an array of sampling lenslets. Upon tilting of the compound, a moiré shape moves in at least one direction and while moving, the moiré intensity levels significantly change but keep showing the same moiré shape. Upon tilting of the compound, the change of moiré intensity levels yields within the moiré shape a clearly visible beating effect. Despite the evolution of the moiré intensity levels, there remains a strong contrast at the boundaries of the moiré shape. When authenticating a document or valuable article incorporating such a compound, one can check the presence of a moving moiré whose intensities also change significantly, but whose shape remains substantially the same. In addition, one can check that at any given tilt angle, similar parts of a moving moiré shape have similar intensities. When further examining the compound, one may verify with a magnifying glass that the tiny shapes present in the modified base have intensities that differ at different positions. The examination of the moiré produced by such a compound can be carried out by a human being or by acquisition with a camera and verification of the different authentication features by a computing system (e.g. a smartphone) running the authentication software.

In the case of a 2D-LL moving and beating moiré, one can verify that upon tilting in one direction, horizontal or vertical, the moiré shape moves and its intensity levels significantly change and that upon tilting in the perpendicular direction, vertical or horizontal, the moiré shape moves and its intensity levels remain similar.

The modified base layer can be created either as a device capable of reflecting or transmitting variable light intensities or as a device capable of reflecting or transmitting only two intensities, dark or bright. In that case, the modified base has to be halftoned. In the case of simple tiny shapes like letters or symbols, it is possible to simply threshold the variable intensity reflecting or transmitting tiny shapes of the modified base. For a more advanced embodiment, it is possible to halftone the modified base by applying a dithering operation. When using printing techniques, the "black" parts of the halftone are inked and the "white" parts of the halftone are left transparent in case of a transparent substrate or left diffusely reflective in case of a white reflecting substrate. When patterning with metal, the bilevel modified base may have its "white" halftone parts patterned with flat metal and its "black" halftone parts either left transparent in case of a transparent substrate or made diffusely reflecting in case of a white diffusely reflecting substrate. Note that "white" and "black" parts can be exchanged. A modified base layer with patterned flat metal parts creates a moiré with a strong contrast, when seen in specular viewing mode and therefore facilitates the authentication of the device that incorporates the compound.

BRIEF DESCRIPTION OF THE DRAWINGS

FIG. 1A shows an elevation profile that is used to create the base layer of a level-line moiré;

FIG. 1B shows the base layer with the grating of bands shifted in proportion to the elevation, where each band forms a gradient of intensity values;

FIG. 1C shows a revealing layer made of a grating of transparent lines;

FIG. 1D shows the level-line moiré obtained by the superposition of the base shown in FIG. 1B and the revealer shown in FIG. 1C;

FIGS. 2A, 2B, 2C, 2D, 2E, 2F, 2G, 2H, 2J show the evolution of the level-line moiré and especially of its intensities, when the revealer is shifted by a fraction $\Phi$ of the revealing layer period;

FIG. 4A shows the base of a 1D moiré; FIG. 4B shows the transparent sampling lines of the revealer; FIG. 4C shows the moiré obtained by the superposition of the base of FIG. 4A and the revealer of FIG. 4B;

FIGS. 8A, 8B, 8C, 8D, 8E, and 8F show a simulation of the moving and beating effect on a part of the moiré, when displacing the revealer sampling array of lines by increments of $\Delta\Phi=\frac{1}{6}$ of the repetition period;

FIG. 16A displays photographs of a compound showing that a horizontal tilt of the horizontally and vertically laid out 2D-LL moiré displaces the moiré horizontally but does not induce a change in intensity levels of the moiré shape;

FIG. 16B displays photographs of the same compound as in FIG. 16A showing that a vertical tilt of the horizontally and vertically laid out 2D-LL moiré induces both a vertical displacement of the moiré and a significant change in intensity levels, but keeps the overall moiré shape recognizable;

DETAILED DESCRIPTION OF THE INVENTION

The moiré shapes generated by 1D and 2D moiré techniques, as well as the level line moiré result from sampling a base layer comprising foreground (black) and background (white) shapes by a revealing layer made of an array of lenslets. The present invention aims at combining the 1D and 2D moiré techniques with the level-line moiré technique, in order to obtain moiré shapes that while moving in one direction show a circular shift of their gray levels.

Vocabulary

We use the general terms of "sampling grating", "sampling array", "grating of sampling elements" or "array of sampling elements" in one dimension (1D) both for a sampling grating of transparent lines and for a sampling grating of cylindrical lenslets. In two dimensions (2D), the terms "sampling grating", "sampling array", "grating of sampling elements" or "array of sampling elements" are used both for a 2D array of transparent dots or holes and for a 2D array of spherical or aspherical lenslets.

In the context of base layer tiny shapes and of lenslets, the terms "array" and "grating" are used interchangeably. We use the term "cylindrical lenslets" as a generic term for lenslets whose cross-section are e.g. a section of a circular disk or a section of a parabola and that follow a straight or a curvilinear path. A grating of cylindrical lenslets may cover a region of the plane. Between each lenslet of a grating of cylindrical lenslets, there may be no space or a small space. The period of such a grating is defined as the repetition period of its cylindrical lenslets. Revealing layer gratings are often made of an array of cylindrical lenses following a straight path. More complex revealing layer gratings may follow a curvilinear path such as a cosinus path or a path given by a curve segment (parabolic curve, spiral, etc. . . . ).

We use the term "spherical lenslets", "aspherical lenslets", "spherical lenslet grating", "2D lenslet grating" or "2D array of lenslets" as a generic term for lenslets that may fill the space in a repetitive 2D manner, e.g. with the top section of a small sphere repeating itself along two dimensions. Their shape may be spherical or aspherical. They behave as focussing elements.

In respect to the category of 1D moirés, the "base layer" refers to repeated base bands incorporating flattened shapes. In respect to the category of 1D moving and beating moirés, the flattened shapes have intensities that are circularly shifted on successive base bands (compare FIGS. 6, 603 and 611). These base bands are sampled by the sampling 1D grating of cylindrical lenses.

Figure 15:
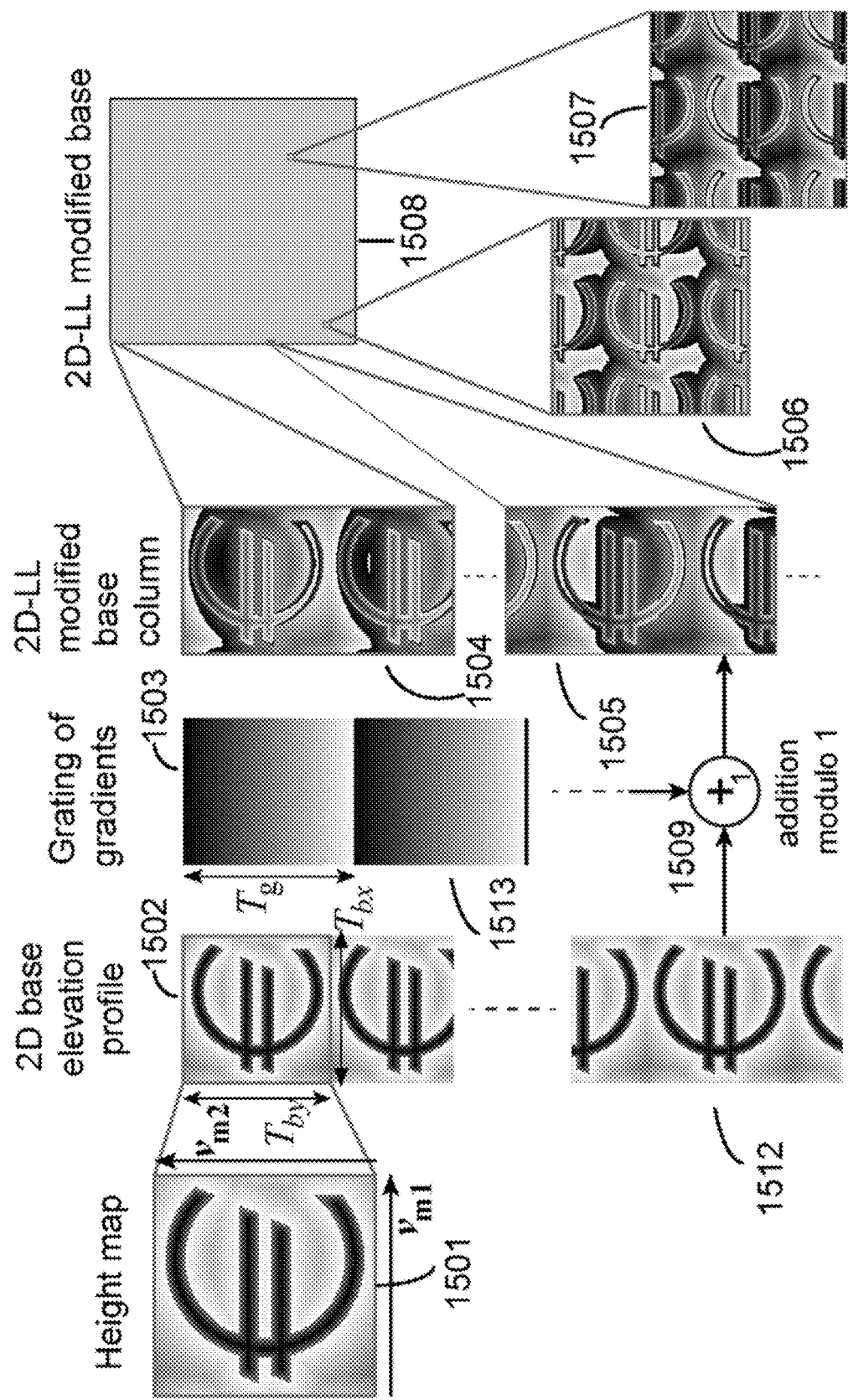
FIG. 15 shows a schematic view of the data representations and the processing operations to create the modified base layer for the 2D-LL moiré with the base, revealer and moiré layers having horizontally and vertically laid out replication and frequency vectors.

In respect to the category of 2D moirés, the "base layer" refers to a two-dimensional array of repeated elements formed by scaled-down shapes. In respect to the category of 2D moving and beating moirés, the scaled-down shapes have intensities that are circularly shifted on successive elements along one of the two orientations (FIG. 15, compare 1506 and 1507). This 2D array of elements is sampled by a 2D grating of spherical or aspherical lenses.

Often the term "revealing layer" is replaced by the term "revealer" and the term "base layer" by the term "base".

We use the term "wedge of intensity values" for a section of a band (FIG. 1, 110) having either a certain intensity profile, e.g. three different intensities 111, 112 and 113, or a gradient of intensities. Bands can be conceived by the aggregation of thick lines having each one a different intensity or color.

Where nothing else is specified, the x-axis of the coordinate system points to the right and the y-axis points downwards, see for example the coordinate axes x and y in FIG. 1B. In some of the explanations however, the y-axis points upwards.

The term "moiré setup" or "compound" refers to a fixed setup comprising superposed base and revealing layer gratings. In general, the revealing layer grating and the base layer grating are located on two parallel planes, located on the two sides of a substrate having a certain thickness. In general, the revealing layer grating samples the light transmitted or reflected by the base layer array of shapes.

The 1D moiré is characterized by a moiré shape moving in one dimension when the revealing layer grating samples successive locations of the base layer grating. When the surface of the moiré layer is sufficiently large, several instances of the moiré shape are visible. The replica are distant one from another by the moiré replication vector $p=(p_x, p_y)$, see FIG. 3B.

The 2D moiré has the capability of moving in two dimensions when the revealing layer grating samples successive locations of the base layer grating. The moiré can move along a vector that is a linear combination of two main directions given by the two replication vectors $v_{m1}=(v_{m1x}, v_{m1y})$ and $v_{m2}=(v_{m2x}, v_{m2y})$, see FIG. 11. The replication vectors are also called displacement vectors, since they define the displacement directions of the moiré.

We use the term "recognizable shape" for a moiré shape resulting from the superposition of the modified base tiny shape grating and the revealing layer lenslet grating. "Recognizable" means that either a human being or a computing system is capable of recognizing the element that is represented by the moiré shape, such as a flag, a face, a house, a forest, an animal, a string of letters and digits, a 1D or 2D barcode, or a QR-code. These moiré shapes may be acquired by a camera and recognized by the authentication software running on the computing system (e.g. a smartphone).

Obtaining Period Vectors from Frequency Vectors

In the context of 2D or 2D-LL moirés, a layer (base, revealing or moiré layer) is formed by parallelogram tiles whose sides define two support vectors ($v_1$, $v_2$) named "period vectors" or "replication vectors". Replicating these tiles repeatedly along the two replication vectors paves the plane. In Fourier spatial frequency space, the fundamental frequencies of the considered layer are described by two frequency vectors ($f_1$, $f_2$). The formula (2) and (4) for obtaining the period vectors as a function of the frequency vectors and vice-versa are stated in the book by I. Amidror, The Theory of the Moiré Phenomenon, Vol. 1, Periodic Layers, $2^{nd}$ Edition, Springer, 2009, page 466. Let us consider the matrix P of period vectors $v_1$, $v_2$ and the matrix F of frequency vectors $f_1$, $f_2$:

$$P = \begin{bmatrix} v_1 \\ v_2 \end{bmatrix} = \begin{bmatrix} v_{1x} & v_{1y} \\ v_{2x} & v_{2y} \end{bmatrix}; F = \begin{bmatrix} f_1 \\ f_2 \end{bmatrix} = \begin{bmatrix} f_{1x} & f_{1y} \\ f_{2x} & f_{2y} \end{bmatrix} \quad (1)$$

The formula for obtaining the period vectors from the frequency vectors and for obtaining the frequency vectors from the period vectors are the following:

$$P = [(F)^T]^{-1}; F = [(P)^T]^{-1} \quad (2)$$

where $[\ ]^T$ is the transpose operator and where $[\ ]^{-1}$ is the matrix inversion operator. Expressed in terms of the vector coefficients we obtain for the period vector as a function of the frequency vectors:

$$P = [(F)^T]^{-1} = \begin{bmatrix} f_{1x} & f_{2x} \\ f_{1y} & f_{2y} \end{bmatrix}^{-1} \quad (3)$$

$$\begin{bmatrix} v_{1x} & v_{2x} \\ v_{1y} & v_{2y} \end{bmatrix} = \begin{bmatrix} f_{1x} & f_{2x} \\ f_{1y} & f_{2y} \end{bmatrix}^{-1} = \frac{1}{f_{1x}f_{2y} - f_{2x}f_{1y}} \cdot \begin{bmatrix} f_{2y} & -f_{2x} \\ -f_{1y} & f_{1x} \end{bmatrix} \quad (4)$$

Linear Transformation from Base Layer Space to Moiré Layer Space

The base layer space is defined by the replication vectors $v_{b1} = (v_{b1x}, v_{b1y})$ and $v_{b2} = (v_{b2x}, v_{b2y})$ of its parallelogram tiles. The moiré layer is also defined by the replication vectors $v_{m1} = (v_{m1x}, v_{m1y})$ and $v_{m2} = (v_{m2x}, v_{m2y})$ of its moiré tiles. The linear transformation described by the coefficients $b_{11}$, $b_{12}$, $b_{21}$, $b_{22}$ from base layer space to moiré space is obtained by requiring the base replication vector to be mapped onto the moiré replication vectors, i.e. by solving the following equation:

$$\begin{bmatrix} v_{m1x} & v_{m2x} \\ v_{m1y} & v_{m2y} \end{bmatrix} = \begin{bmatrix} b_{11} & b_{12} \\ b_{21} & b_{22} \end{bmatrix} \begin{bmatrix} v_{b1x} & v_{b2x} \\ v_{b1y} & v_{b2y} \end{bmatrix} \quad (5)$$

With the Mathematica software for example, one can easily solve this equation and obtain the base to moiré transformation coefficients:

$$b_{11} = \frac{v_{b1y} \cdot v_{m2x} - v_{b2y} \cdot v_{m1x}}{v_{b1y} \cdot v_{b2x} - v_{b1x} \cdot v_{b2y}}; \quad (6)$$

$$b_{12} = \frac{v_{b2x} \cdot v_{m1x} - v_{b1x} \cdot v_{m2x}}{v_{b1y} \cdot v_{b2x} - v_{b1x} \cdot v_{b2y}}$$

$$b_{21} = \frac{v_{b1y} \cdot v_{m2y} - v_{b2y} \cdot v_{m1y}}{v_{b1y} \cdot v_{b2x} - v_{b1x} \cdot v_{b2y}};$$

$$b_{22} = \frac{v_{b2x} \cdot v_{m1y} - v_{b1x} \cdot v_{m2y}}{v_{b1y} \cdot v_{b2x} - v_{b1x} \cdot v_{b2y}}$$

Short Description of the Level-Line Moiré

Level-line moiré (FIG. 1D) are a particular subset of moiré fringes, where both the revealing layer grating (e.g. FIG. 1C) and the base layer grating (e.g. FIG. 1B) have the same period, i.e. $T = T_r = T_b$, where $T_r$ is the revealing layer period, and $T_b$ is the base layer period. Level line moirés enable visualizing the level lines of an elevation profile function E(x,y), (e.g. FIG. 1A, where white means a high elevation and black means no elevation). For example, by superposing a base layer grating whose horizontal bands are vertically shifted in proportion to the elevation profile function E(x,y) and a horizontal revealing layer grating having the same line period as the base layer grating, one obtains a level-line moiré (e.g. FIG. 1D).

FIG. 1A shows an elevation profile. FIG. 1B shows the corresponding base layer with the shifted grating of bands, where each band is formed by a wedge of intensity values. FIG. 1C shows a transparent line sampling grating as revealer. FIG. 1D shows the moiré obtained as superposition of the base layer shown in FIG. 1B and the revealing layer shown in FIG. 1C. By moving the revealer vertically on top of the base, different base positions are sampled and yield a beating effect as shown in the succession of FIGS. 2A to 2J. This beating effect is obtained due to a circular shift of the sampled intensity values when sampling successive locations of the base layer. Indeed, since each band is formed by an intensity wedge, sampling successions of locations perpendicularly to the main band orientation yield an increase of intensity values modulo the number of intensity values.

The revealing layer shown in FIGS. 2A to 2J is an array of transparent lines. However in a real device, the revealing layer would be embodied by an array of cylindrical lenses sampling the base layer. In such an embodiment, the dark-bright high-frequency discontinuities would disappear. In level-line moirés, constant intensity levels are displayed as level lines (constant intensity lines) of the elevation profile shown in FIG. 1A. By displacing the revealing layer sampling locations downwards in increasing y direction, the displayed moiré intensity values also increase or decrease. For example, at locations 100 (intermediate), 101 (bright) and 102 (dark) of the elevation profile, one obtains in the moiré figures FIGS. 2A to 2J at the corresponding locations α, β and γ, the following evolution. The intermediate intensity (FIG. 2A) at position α becomes dark (FIG. 2B, 2C) and then bright (FIGS. 2F, 2G) and then intermediate again (FIG. 2J). The bright intensity locations (FIG. 1D) at position β become intermediate (FIG. 2C), dark (FIG. 2D) and then bright again (FIG. 2J). The dark locations (FIG. 1D) at position γ become bright (FIG. 2C) and then intermediate (FIG. 2E) and dark again (FIG. 2J). These evolutions of the intensities at each position of the moiré shape create the visually attracting beating effect and in addition enable verifying that the observed moiré is a genuine one. The beating effect is characterized by the fact that it changes the intensity levels but keeps the same moiré shape despite the changes in intensity levels.

In the present example, the transparent line grating (FIG. 1C) of the revealing layer samples the underlying base layer (FIG. 1B). However, in most real-world embodiments, instead of a transparent line grating, an array of cylindrical lenses is used for sampling the base layer bands. The much more precise sampling by the cylindrical lenses yields a moiré picture which at a superposition phase Φ=0 resembles the elevation profile. At other superposition phases, the moiré picture is made of intensity levels that are obtained by a circular shift of the intensity levels present in the elevation profile.

Short Description of the 1D Moiré

Figure 3A:
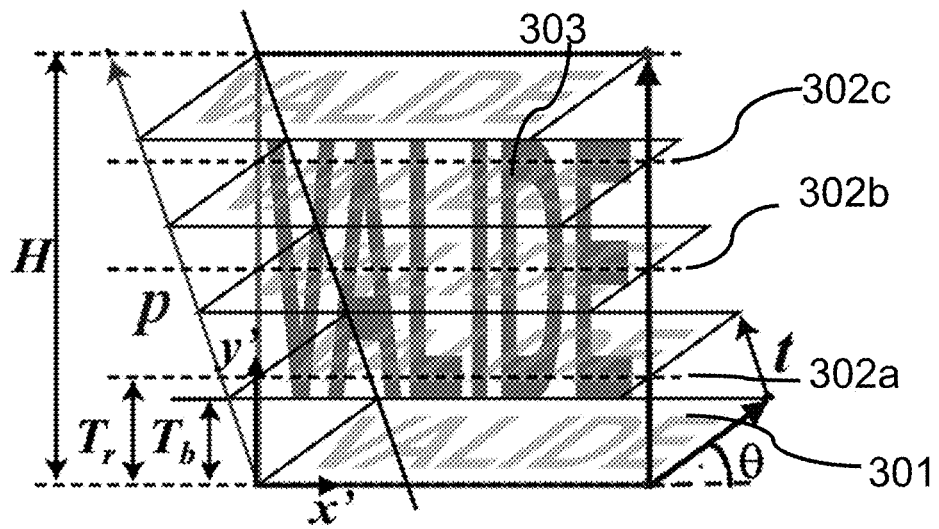
FIG. 3A shows the 1D moiré 303 obtained by the superposition of a grating of replicated base bands 301 and of the sampling revealer lines 302a, 302b, 302c.
Figure 3B:
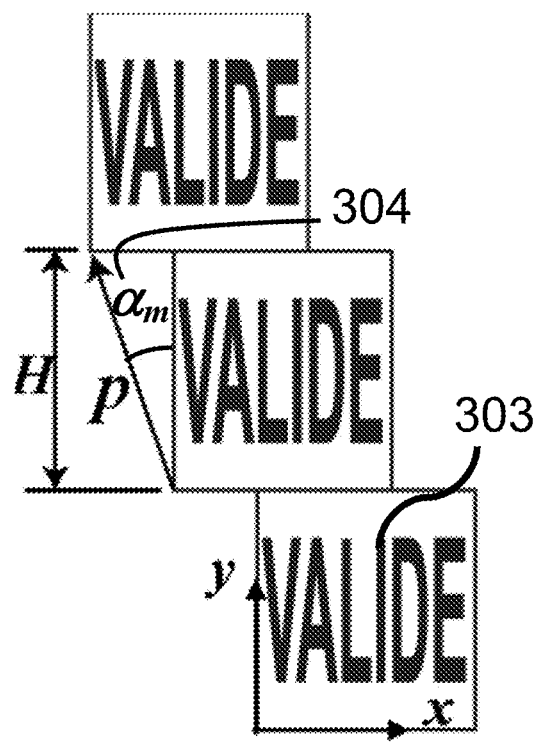
FIG. 3B shows the same 1D moiré 303 as in FIG. 3A, its replica, and its displacement direction p.

A thorough description of the 1D moiré is given in U.S. Pat. No. 10,286,716. FIGS. 3A and 3B show the relationship between base coordinates and moiré coordinates for a rectilinear moiré, i.e. a moiré defined as a linear transformation of the replicated base bands. Base band 301 of base band period $T_b$ with oblique base band tiny letter shapes "VALIDE" is replicated by integer multiples of vector $t=(t_x, t_y)$ across the base layer to form the base band grating. The corresponding moiré shapes 303 "VALIDE" are obtained by the revealing layer sampling lines 302a, 302b, 302c, . . . having period $T_r$ sampling the base bands successively at different locations. The vertical component $t_y$ of base band replication vector t is equal to the base band period, i.e. $t_y=T_b$. According to [Hersch and Chosson 2004], see reference at the end of the present document, the moiré space coordinate (x,y) in function of the base space coordinates (x',y') is:

$$\begin{bmatrix} x \\ y \end{bmatrix} = \begin{bmatrix} 1 & \frac{t_x}{T_r - T_b} \\ 0 & \frac{T_r}{T_r - T_b} \end{bmatrix} \begin{bmatrix} x' \\ y' \end{bmatrix} \quad (7)$$

where $T_r$ is the revealer sampling line period. Equation (7) expresses with its matrix the linear relationship L between base space coordinates (x',y') and moiré space coordinates (x,y).

By inserting the components $(t_x, t_y)$ of base band replication vector t as (x',y') into Eq. (1), and equating $t_y=T_b$, one obtains the moiré replication vector $p=(p_x, p_y)$. This calculation shows that the moiré replication vector p is the base band replication vector t multiplied by $T_r/(T_r-T_b)$. The moiré height $H_M$ is equal to the vertical component $p_y$ of the moiré replication vector p, i.e. $H_M=p_y$. Therefore, $$H_M = \frac{T_r \cdot T_b}{T_r - T_b} \quad (8)$$

A designer can freely choose his moiré image height $H_M$ and the direction of its movement am by defining replication vector $p=(p_x, p_y)$, with $p_y=H_M$ and $p_x=-H_M \tan \alpha_m$ (see FIG. 3B, 304). He can then solve Eq. (7) for $t_y$ and $t_x$:

$$t_y = \frac{T_r \cdot p_y}{T_r + p_y}; t_x = \frac{T_r \cdot p_x}{T_r + p_y} \quad (9)$$

or $$t_x = \frac{(T_r - t_y) \cdot p_x}{T_r} \quad (10)$$

After selecting a suitable value for the revealing layer period $T_r$, an imaging software module can then linearly transform a moiré image defined in the moiré coordinate space (x,y) into a base band defined in the base layer coordinate space (x',y') by applying the inverse of Eq. (7), i.e.

$$\begin{bmatrix} x' \\ y' \end{bmatrix} = \begin{bmatrix} 1 & -\frac{t_x}{T_r} \\ 0 & \frac{T_r - T_b}{T_r} \end{bmatrix} \begin{bmatrix} x \\ y \end{bmatrix} \quad (11)$$

Let us take as example of the rectilinear 1D moiré the shape "VALID" shown in FIG. 4C. It is formed by the superposition of base layer base bands (FIG. 4A) with foreground shapes 410 (black) and background shapes 411 (white) and a revealing layer (FIG. 4B) formed of an array of transparent sampling lines 412. In this concrete example, the moiré repetition vector is $p=(p_x, p_y)=(-200 \mu m, 1600 \mu m)$, the revealing layer period is chosen as $T_r=400 \mu m$. We obtain according to Eq. (3) the base band period $T_b=t_y=320 \mu m$ and the x-component of vector t, $t_x=-40 \mu m$. The moiré height is $H=p_y=1600 \mu m$. The transparent sampling lines 412 show the positions of the centerlines on which the cylindrical lenslets of the revealing layer are placed.

Figure 5:
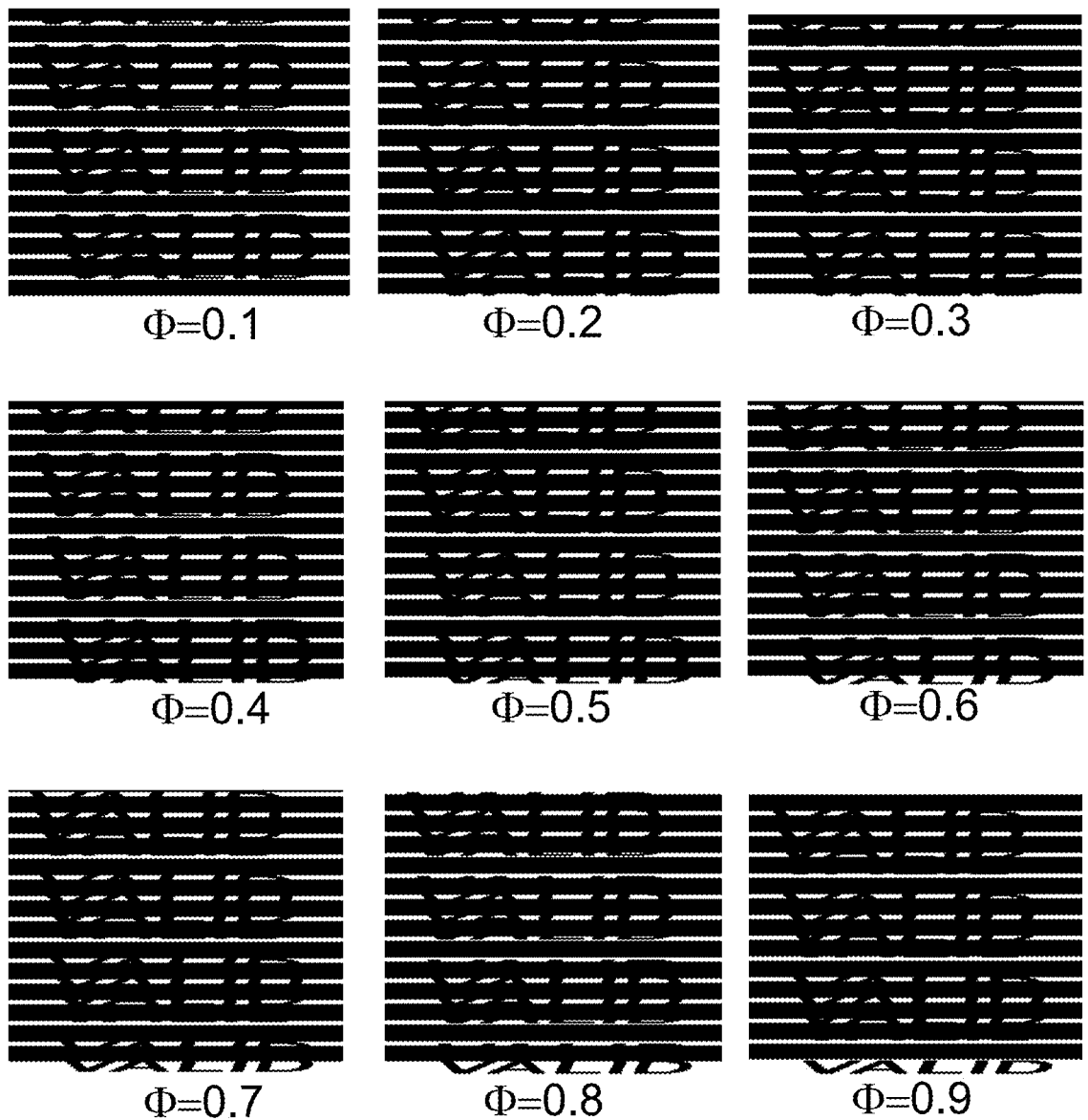
FIG. 5 shows the movement of the 1D moiré shown in FIG. 4C, when moving the revealer upwards on top of the base by a fraction $\Phi$ of the revealing layer period.

FIG. 5 shows the movement of the 1D moiré upon displacement of the sampling locations defined here by the transparent revealer layer lines. The moiré on FIG. 4C is the moiré obtained at the initial placement of the revealing layer grating: the displacement is $\Phi=0$. FIG. 5 shows the displacement of the moiré when displacing the revealer by fractions of the revealer period $T_r$, fractions that range from $\Phi=0.1$ to $\Phi=0.9$. The revealing layer moves upwards and the moiré moves downwards, as shown in FIG. 5, from left to right and from top to bottom.

Note that the 1D moiré replication vector p is the equivalent of the 2D moiré replication vectors $v_{m1}$ and $v_{m2}$ and the 1D base replication vector t corresponds to 2D base replication vectors $v_{b1}$ and $v_{b2}$.

Figure 10:
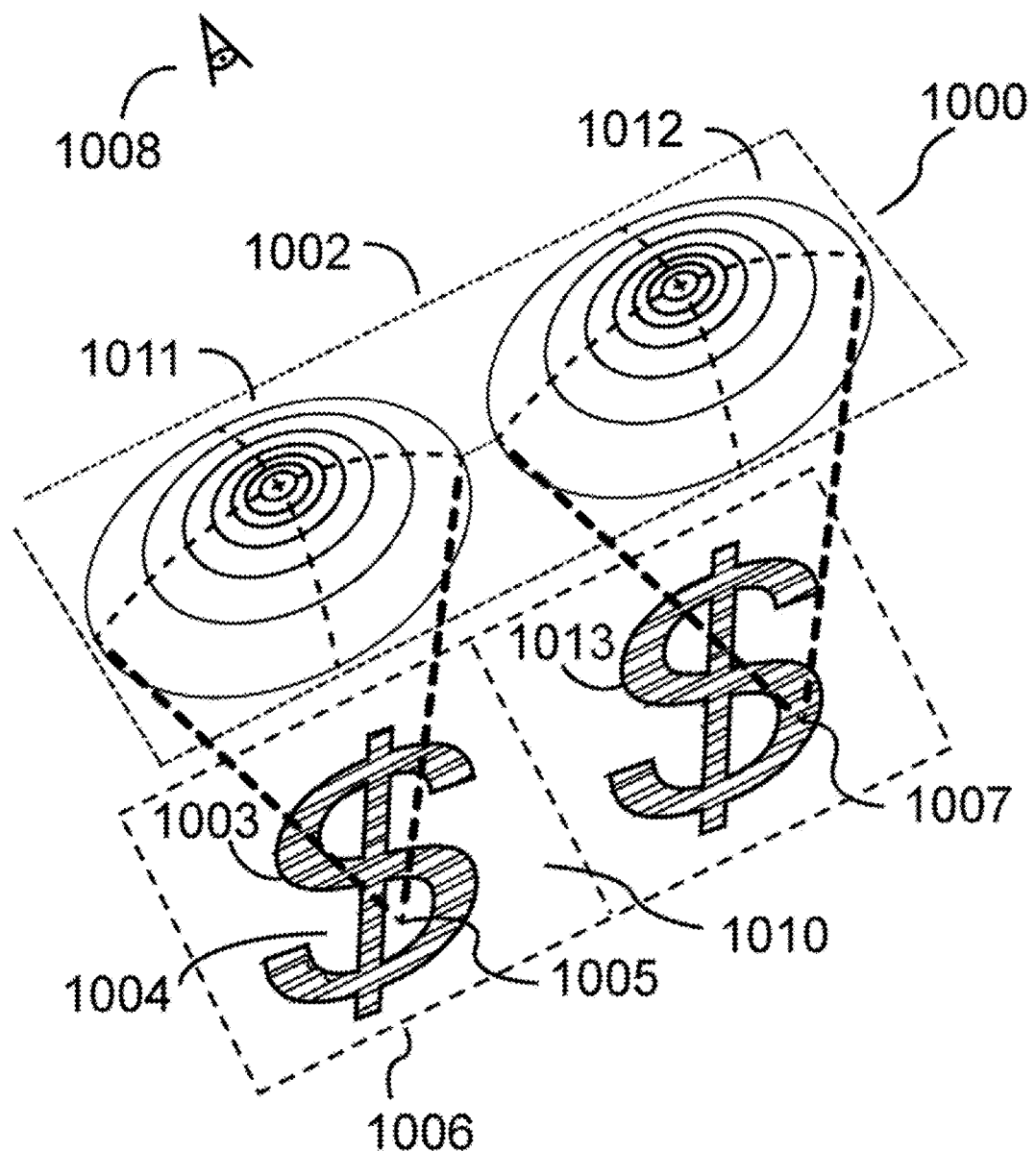
FIG. 10 shows schematically a revealing layer embodied by a 2D array of microlenses 1002 sampling a base layer formed by a 2D array of tiny "$" shapes 1003 and 1013.

The 1D moirés need not be rectilinear. As described in U.S. Pat. No. 10,286,716, the moiré shape may be laid out along a curvilinear path such as for example a circular path (US Pat. 10,286,716, FIG. 10A). Upon displacement of the revealing layer sampling positions, the moiré may move perpendicularly or obliquely in respect to its layout path, for example radially or along part of a spiral. An example of a circularly laid out moiré is shown in U.S. Pat. No. 10,286,716, FIGS. 11, 12 and 13. When displacing the revealing layer on top of the base layer, the moiré moves radially as shown by positions of the moiré in FIG. 12 and FIG. 13 of U.S. Pat. No. 10,286,716.

Synthesis of a Combined 1D and Level-Line Moiré

We disclose here a method for synthesizing special 1D moiré shapes that have the same moving behaviour as the 1D moiré shapes shown in FIG. 5 and that in addition have a beating shape behaviour that is similar to the one shown in FIGS. 2A to 2J. These moirés are called "Combined 1D and level-line moirés" or shortly "1D-LL" moirés. The steps to generate the base layer of a 1D-LL moiré are the following, illustrated by the scheme of FIG. 6:

1. Define a "Height map" 600 that has the same layout as the desired moving 1D moiré.

The definition of the height map includes its parameters, mainly the moiré replication vector p whose vertical component $p_y$ is equal to the moiré height, i.e. $H_M=p_y$. The height map should be designed in a similar manner as the elevation profiles used for the level-line moiré. It is especially important that there is a high intensity gradient at the boundaries of the letters, numbers and symbols, as shown in the height map 600 of FIG. 6, where the letters "E", "P", "F", "L" show a strong intensity contrast at their boundaries. One method to create such intensity gradients at the boundaries of the shapes is described in U.S. Pat. No. 7,305,105, Section "Synthesis of a shape elevation profile".

Figure 6:
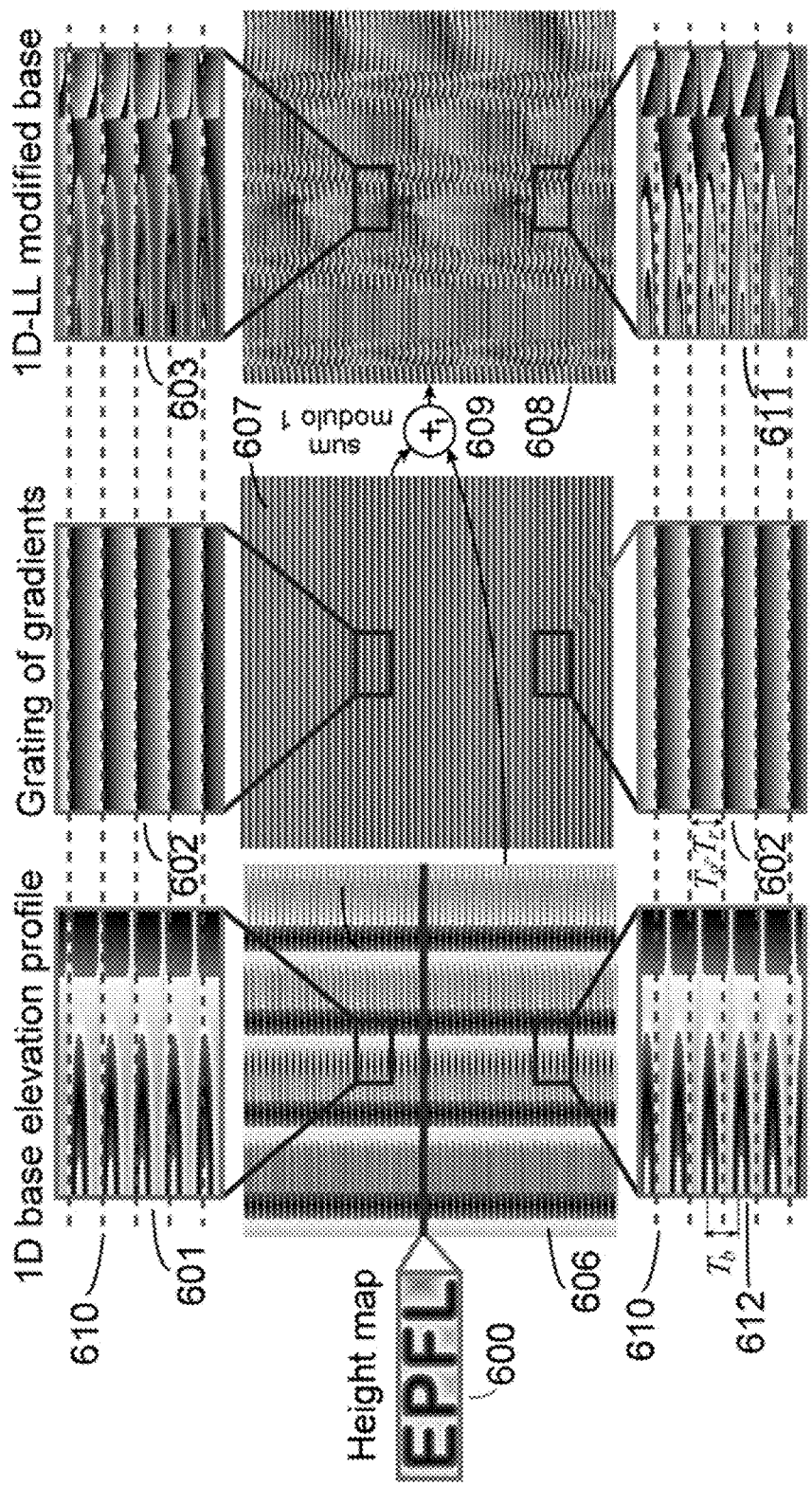
FIG. 6 shows a schematic view of the data representations and the processing operations to create the modified base layer for the 1D-LL moiré.
Figure 7A:
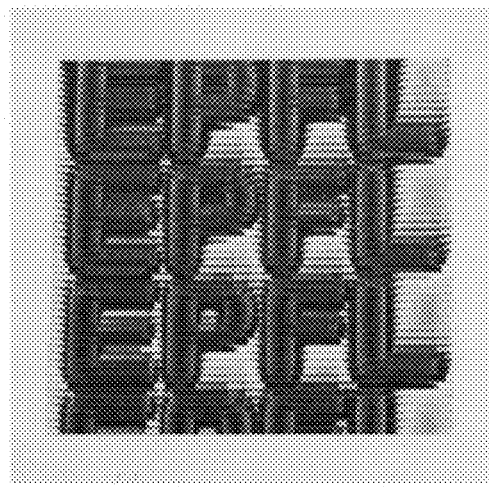
FIGS. 7A, 7B, 7C, 7D, 7E, 7F show photographs of a 1D-LL moving and beating moiré viewed at successive tilt angles around the horizontal axis on a compound formed by the superposition of a 1D-LL modified base patterned by metal and of a revealing layer made of an array of horizontally laid out cylindrical lenses.
Figure 7B:
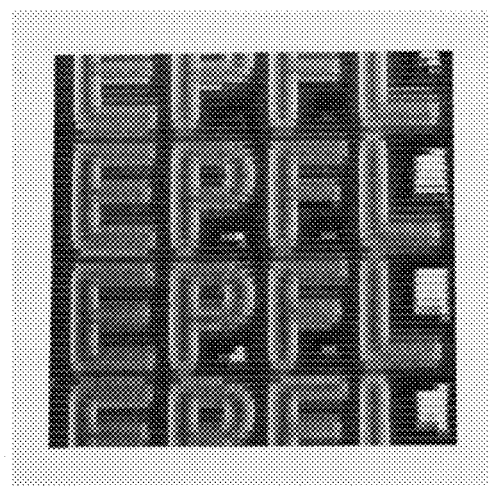
Figure 7C:
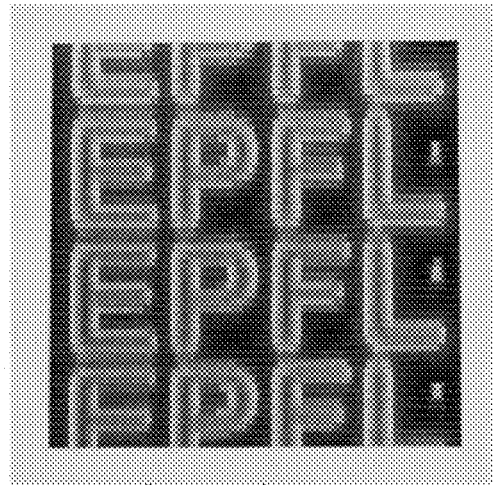
Figure 7D:
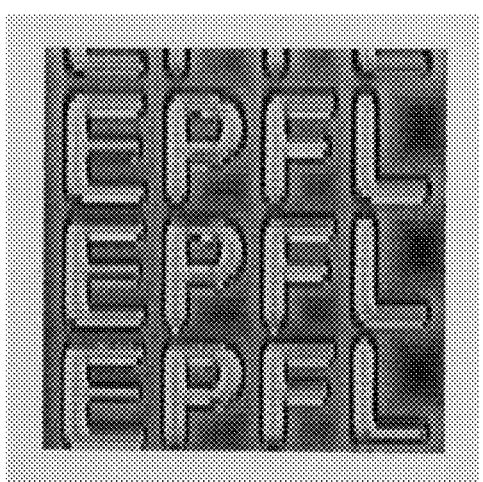
Figure 7E:
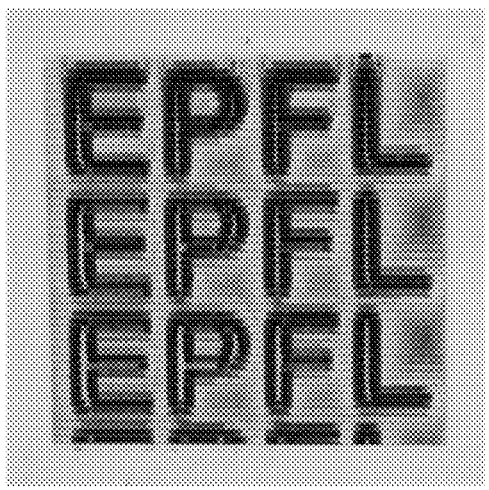
Figure 7F:
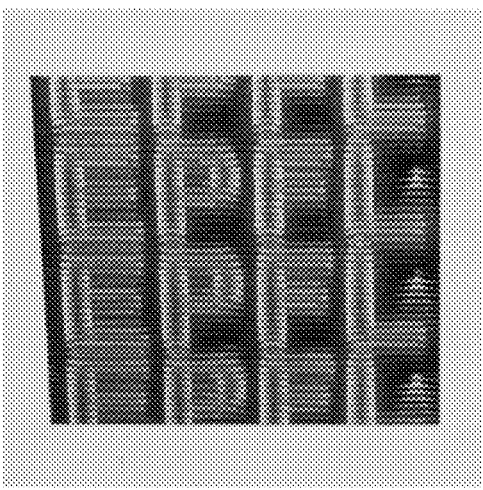

2. Define the period $T_r$ of the revealing layer sampling grating appropriate for the final application. The revealing layer sampling locations are indicated in FIG. 6 by the dashed lines 610.

3. Calculate according to formula (9) the base layer period $T_b = t_y$.
4. Traverse the 1D base elevation profile space (606, zoom: 601, 612) and by applying the transformation mapping base layer positions 606 to moiré positions 600 (e.g. according to formula (7)), create the 1D base elevation profile 606.
5. Define a "Grating of gradients" 607 (enlarged 602), having a repetition period $T_g$ which in a preferred embodiment is equal to the revealer period $T_r$. There is no necessity to draw this grating of gradients. It is sufficient to obtain the current normalized intensity P at a given position (x,y) of this grating of gradients by performing the operation $P = (y \bmod T_g)/T_g$.
6. Assuming normalized intensity levels, create a "1D-LL modified base" 608 by summing modulo-1 (609) each pixel intensity of the 1D base elevation profile 606 with each corresponding pixel intensity of the grating of gradients 607.

The resulting 1D-LL modified base 608 (enlarged 603 and 611) replaces the classical base present in 1D moirés (e.g. FIG. 4A). When superposed with a revealing sampling layer, e.g. an array of cylindrical lenslets of period $T_r$, the resulting combined 1D-LL moiré moves and also shows the beating effect characteristic for the level-line moiré. In the resulting 1D-LL modified base, the position of the tiny shapes 603 or 611 is the same as the ones 601 and 612 of the corresponding tiny shapes in the 1D base elevation profile, but due to the modulo-1 operation they have different intensity levels.

Figure 18A:
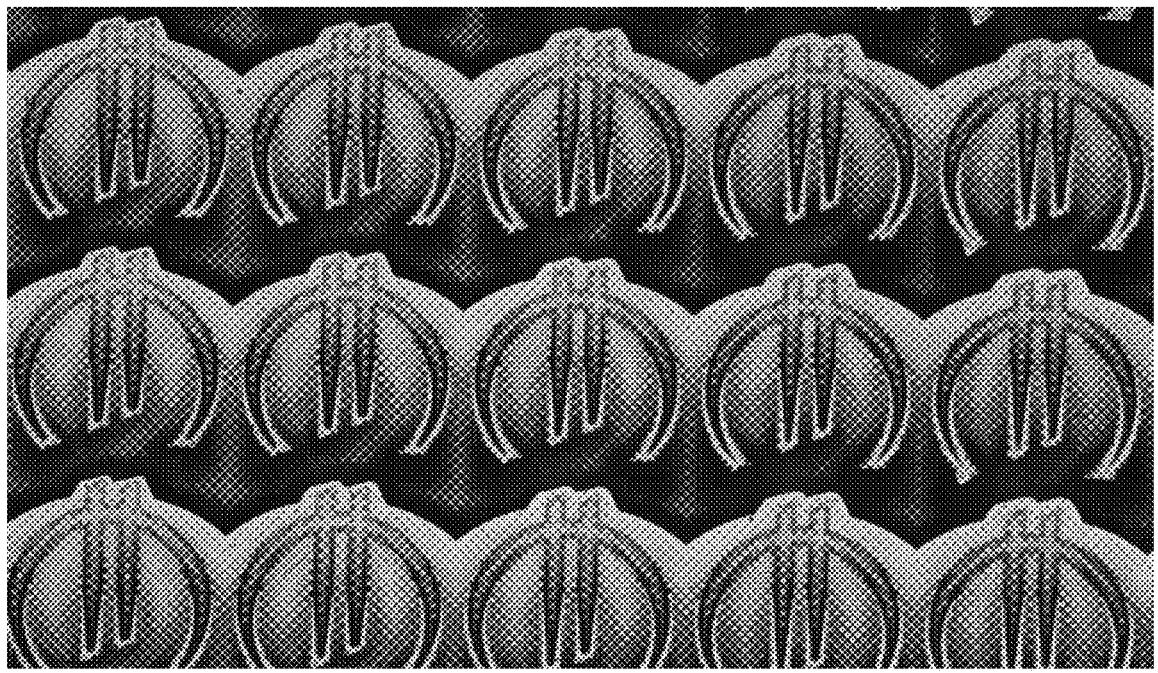
FIG. 18A shows an example of a halftoned 2D-LL modified base, obtained with a dithering operation.
Figure 18B:
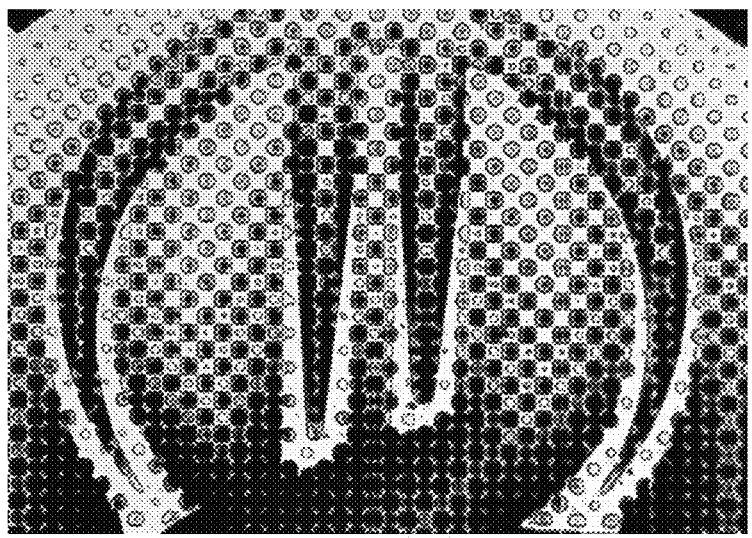
FIG. 18B shows an enlargement of a part of the halftoned 2D-LL modified base of FIG. 18A.
Figure 18C:
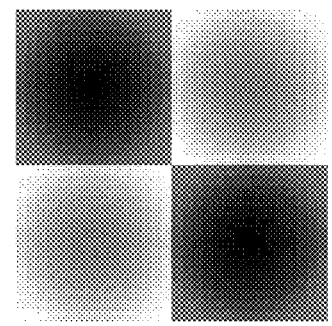
FIG. 18C shows an example of a dither matrix used to apply the dithering operation.

If the modified base needs to be binary, for example in the case it is formed by the presence or absence of a metallic layer, then halftoning is recommended. In that case it is advisable to halftone the 1D-LL modified base 608 (enlarged: 603 or 611) for example by dithering with a dither matrix as described in the Section "Combined 2D and level-line moiré: freely chosen layout". FIG. 18B shows a halftone element etched into an aluminium layer, where the halftoning operation is performed by dithering with the dither matrix shown in FIG. 18C.

FIGS. 7A to 7F show photographs of the moiré shapes obtained at successive tilt angles around the horizontal axis by a compound formed of the 1D-LL modified base 608 (or formed by its halftoned instance) and a revealing layer formed by horizontally laid out cylindrical lenses of repetition period $T_r$. From FIG. 7A (tilt angle γ) to FIG. 7B (tilt angle δ) the moiré letters "EPFL" move slightly to the top and the gray values undergo a circular shift: part of the white letter background becomes dark. The dark values of the letter foreground become intermediate. As a further example, from FIG. 7C (tilt angle γ) to FIG. 7D (tilt angle δ), the intermediate intensity values of the letter foreground become bright and the dark values of the letter background become intermediate. At the same time the moiré letters have moved towards the top. Circular shifts of the intensity values and moiré displacements are also observable in the transition between FIG. 7E to FIG. 7F. For design and verification, the example shown in FIGS. 7A to 7F was first realized by a print with base layer repetition period $T_b = 1.197$ mm, revealing grating of cylindrical lenses of period $T_r = 1.274$ mm and a resulting moiré height H=19.8 mm. The corresponding final compound created in the clean room for anti-counterfeiting purposes has the following dimensions: moiré height H=4.2 mm, rev layer grating of cylindrical lenses with period $T_r = 0.270$ mm and base layer period $T_b = 0.2537$ mm. The sag-height of the cylindrical lenses is 52 μm, the lens curvature radius is 200 μm and the focal length is 602 μm. The base layer is patterned with metal on one side of a glass plate having a thickness of 5.5 mm and the array of cylindrical lenslets is placed on the other side of the glass plate.

FIGS. 8A to 8F show a simulation of the moving and beating effect on a part of the moiré, when displacing the revealer sampling array of lines by increments of $\Delta\Phi = \frac{1}{6}$ of the repetition period. The beating effect is produced by having intensity levels evolving according to a circular shift, for example from dark to bright when displacing the sampling revealer downwards, or equivalently, by tilting the compound around the horizontal axis, see for example the center line of the letter "P" in the successive figures FIGS. 8A to 8F, 800a to 800f. On another location (FIG. 8A, 801a), after reaching the brightest value, the next intensity value that appears is dark gray (FIG. 8B, 801b). Then brighter and brighter values appear, see the succession of moirés from FIG. 8C to FIG. 8F, 801c to 801f.

FIGS. 8A to 8F also illustrate the movement of the 1D-LL moiré: when the revealer moves down by a fraction of the revealer period, the moiré shape moves up by the same fraction of the moiré period defined by the vertical component $p_y$ of the moiré replication vector p. In the present example, the horizontal component of vector p is $p_x = 0$.

When the period of the grating of gradients and the period of the revealing layer are identical, then, in the resulting moiré shape, constant intensities follow the level-lines of the target moiré height map (FIG. 6, 600) that appears as moiré. For example, in the moiré simulation of FIGS. 8A to 8F, the center line of the letter "P" has within one moiré instance (e.g. FIG. 8B, 800b) always the same intensity level (near black in FIG. 8B (800b), gray in FIG. 8D (800d) and near white in FIG. 8F (800f)).

In the case of security documents or valuable objects, having both the 1D moving moiré effect and the beating effect proves that the document or the valuable object is authentic. It would be very difficult for potential counterfeiters to ensure that the repetition period $T_g$ of the grating of gradients is exactly the same as the revealer period $T_r$. Small deviations of the repetition period or of the superposition angle between base and revealer lead to distortions of the revealed moiré. Such distortions yield a clear degradation or destruction of the shape that the moiré should show.

Short Description of 2D Moirés

The theory regarding the analysis and synthesis of 2D moiré images is known, see the publications [Kamal, Völkel & Alda 1998], [Amidror 2009], listed at end of the present document. In addition, U.S. Pat. No. 10,286,716 gives a short description of how to synthesize 2D moirés.

Figure 9:
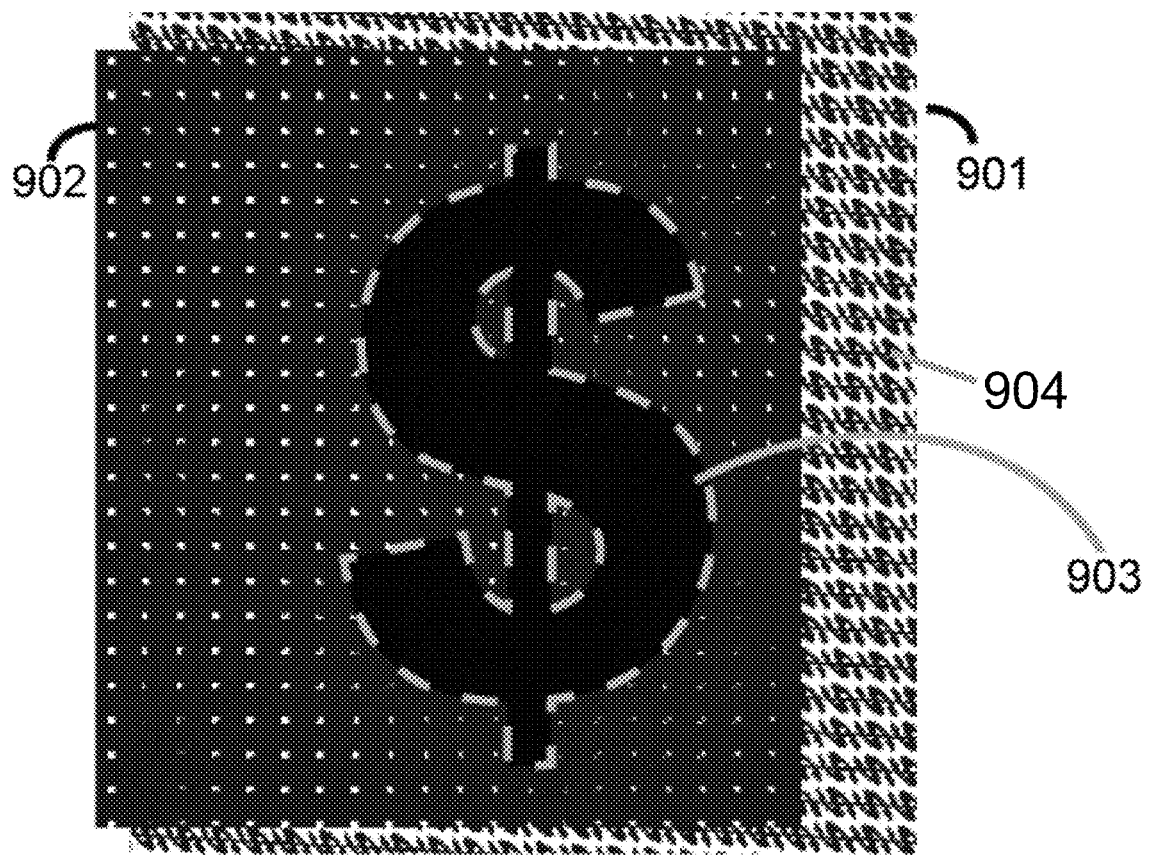
FIG. 9 shows a large "$" shape as 2D moiré formed by the superposition of a 2D array of tiny "$" shapes 901 and of a 2D sampling array of tiny transparent dots 902.

The sampling of a 2D array of tiny shapes (FIG. 9, 901) by an array of tiny holes or transparent dots 902 or instead by a 2D array of microlenses yields a 2D moiré shape 903 formed of an enlarged and rotated instance of the tiny shape 904. We use here the formulation derived by S. Chosson in his thesis, see [Chosson 2006].

The revealing layer is embodied by a 2D array of microlenses (FIG. 10, 1002), shown schematically by two microlenses (FIGS. 10, 1011 and 1012) and the base layer by a 2D array of tiny shapes shown schematically by two "$" symbols 1003 and 1013. The 2D moiré is created by having an array of cylindrical lenslets 1002 sampling the tiny shapes of the base layer. Each microlens samples a different position within the tiny shapes of the base layer. For example, from a given observation position 1008, microlens 1012 samples position 1007 within the foreground of the tiny shape whereas microlens 1011 samples position 1005 within the background of the tiny shape.

Figure 11:
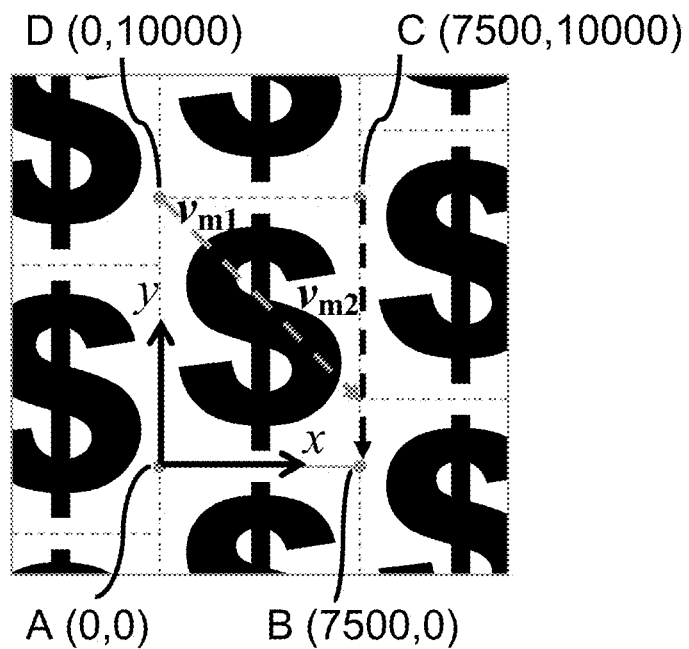
FIG. 11 shows the layout of the desired 2D array of moiré shapes, replicated according to vectors $v_{m1}$ and $v_{m1}$.

According to [Chosson 2006, p. 57-65, formula (63)], for the rectilinear 2D moiré having a horizontally and vertically laid out revealing layer, the equation bringing moiré layer coordinates into base layer coordinates by an affine transformation is the following:

$$\begin{bmatrix} x'' \\ y'' \end{bmatrix} = \frac{1}{(T_{rx} + v_{m2x}) \cdot (T_{ry} + v_{m1y}) - v_{m1x} \cdot v_{m2y}} \begin{bmatrix} T_{rx} \cdot (T_{ry} + v_{m1y}) & -v_{m1x} \cdot T_{rx} \\ -v_{m2y} \cdot T_{ry} & T_{ry} \cdot (T_{rx} + v_{m2x}) \end{bmatrix} \begin{bmatrix} x \\ y \end{bmatrix} \quad (12)$$

where $v_{m1} = (v_{m1x}, v_{m1y})$ is defined as a first moiré displacement vector and $v_{m2} = (v_{m2x}, v_{m2y})$ is defined as a second displacement vector and where $T_{rx}$ and $T_{ry}$ are the revealing layer horizontal and vertical periods. As an example, FIG. 11 gives the coordinates of the desired moiré layout, formed by repetitive moiré tiles paving the plane, replicated with vectors $v_{m1}$ and $v_{m2}$. All numbers are expressed in microns. The desired moiré displacement vectors are $v_{m1} = (7500, -7500)$ and $v_{m2} = (0, -10000)$. The revealing layer periods are set to $T_{rx} = T_{ry} = T_r = 400$ μm.

Figure 12:
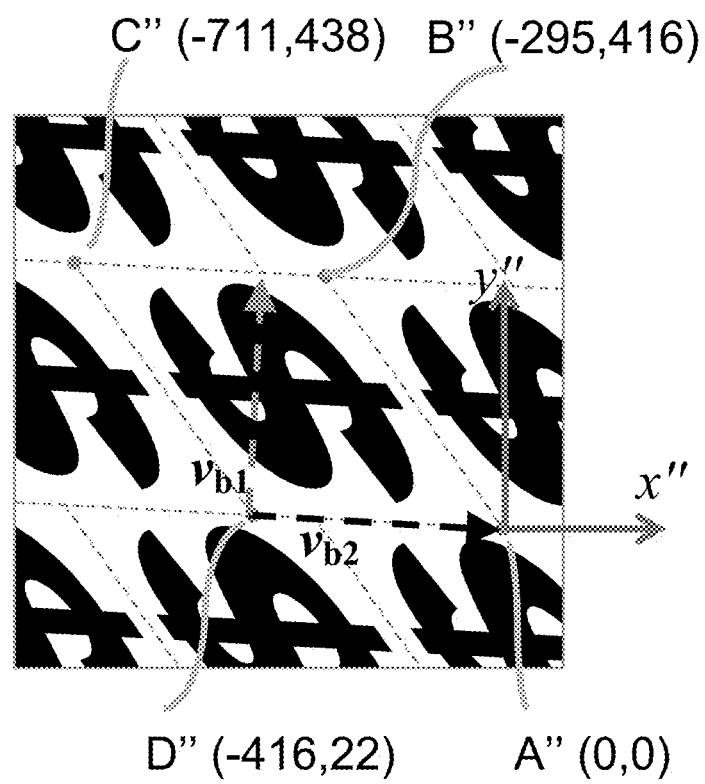
FIG. 12 shows the 2D array of base layer tiny shapes replicated with vectors $v_{b1}$ and $v_{b2}$ derived by a linear transformation from the array of moiré shapes shown in FIG. 11.

Inserting the coordinates of the moiré vertices A, B, C, D shown in FIG. 11 as (x,y) into Equation (12) yields the coordinates of the corresponding base layer vertices A", B", C", D" shown in FIG. 12. Therefore, for the two desired moiré displacement vectors, and for given revealing layer periods, one may calculate the base layer position x", y" corresponding to positions x, y in the moiré image. By inserting the moiré displacement vectors $v_{m1}$ and $v_{m2}$ into Eq. (12), one obtains the corresponding base tile replication vectors $v_{m1}$ and $v_{m2}$ see FIG. 12. By inversion of formula (12), one obtains the affine transformation mapping base layer coordinates x", y" into moiré layer coordinates x, y:

$$\begin{bmatrix} x \\ y \end{bmatrix} = \begin{bmatrix} \frac{T_{rx} + v_{m2x}}{T_{rx}} & \frac{v_{m1x}}{T_{ry}} \\ \frac{v_{m2y}}{T_{rx}} & \frac{T_{ry} + v_{m1y}}{T_{ry}} \end{bmatrix} \begin{bmatrix} x'' \\ y'' \end{bmatrix} \quad (13)$$

By scanning the base layer (x", y") at successive x" and y" coordinates, scanline by scanline, the computer program finds according to Eq. (13) the corresponding locations x, y within the moiré image, reads at each location the intensity or color and copies it back into the current base layer location (x", y"). This enables creating the corresponding base layer 2D array of tiny shapes.

U.S. Pat. No. 10,286,716 explains in detail how to extend formula (12) and (13) in order to obtain curvilinear 2D moiré layouts, e.g. a circular layout of the moiré shapes. This is achieved by specifying a geometrical transformation $M(x_t, y_t)$ from curvilinear moiré space $(x_t, y_t)$ to rectilinear moiré space (x,y). Formula (14) given below enables calculating a transformation $H(x_t, y_t)$ that maps locations from curvilinear base layer space to the rectilinear base layer space incorporating a "virtual" 2D array of tiny shapes. This virtual 2D array of tiny shapes is defined by the transformation given by formula (13) mapping the rectilinear base layer space (x", y") into the rectilinear moiré space (x,y).

In order to generate the base layer that upon superposition with the revealing layer produces the desired curvilinear moiré, one first specifies the desired curvilinear moiré layout by the geometrical transformation $M(x_t, y_t)$. Then according to the selected layout of the revealing layer $G(x_t, y_t)$, one obtains the transformation $H(x_t, y_t)$ that maps locations from curvilinear base layer $(x_t, y_t)$ space to the rectilinear base layer space (x", y"). Formula (14) enables calculating this transformation.

Transformations M, G, and H are defined as follows: $M(x_t, y_t) = (m_x(x_t, y_t), m_y(x_t, y_t))$, $G(x_t, y_t) = (g_x(x_t, y_t), g_y(x_t, y_t))$, and $H(x_t, y_t) = (h_x(x_t, y_t), h_y(x_t, y_t))$. Then, according to [Chosson 2006, pp. 111-112] transformation $H(x_t, y_t)$ is obtained by computing $$\frac{h_x(x_t, y_t)}{T_{bx}} = \frac{m_x(x_t, y_t)}{H_x} + \frac{g_x(x_t, y_t)}{T_{rx}} \quad (14)$$

$$\frac{h_y(x_t, y_t)}{T_{by}} = \frac{m_y(x_t, y_t)}{H_y} + \frac{g_y(x_t, y_t)}{T_{ry}}$$

By scanning the curvilinear base layer $(x_t, y_t)$ at successive $x_t$ and $y_t$ coordinates, scanline by scanline, the computer program finds according to transformation $H(x_t, y_t)$ the corresponding locations (x", y") within the rectilinear base layer, and from there within the rectilinear instance of the desired moiré the corresponding location (x,y), reads at that location the intensity or color and copies it back into the current curvilinear base layer coordinate $(x_t, y_t)$. This enables creating the corresponding base layer 2D curvilinear array of tiny shapes. When superposed with the revealing layer specified by transformation $G(x_t, y_t)$, it generates the moiré that is specified by the moiré transformation $M(x_t, y_t)$.

Synthesis of a Combined 2D and Level-Line Moiré

We disclose here a method for synthesizing special 2D moiré shapes that have the same moving behaviour as classical moving 2D moiré shapes and that in addition have along one main orientation a beating shape behaviour that is similar to the one shown in FIG. 2A to 2J. These moirés are called "Combined 2D and level-line moirés" or shortly "2D-LL" moirés.

Figure 13A:
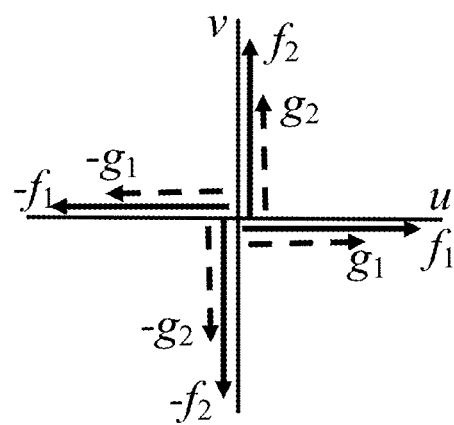
FIG. 13A shows the fundamental frequencies $f_1$ and $f_2$ of the 2D base layer array of tiny shapes as well as the fundamental frequencies $g_1$ and $g_2$ for of the 2D revealing layer array of sampling elements, in the case of horizontally and vertically laid out base and revealer arrays.
Figure 13B:
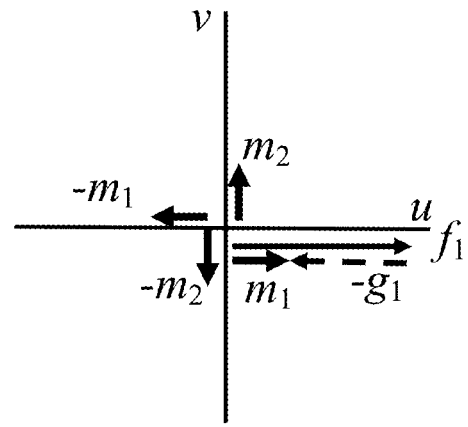
FIG. 13B shows the fundamental frequencies $m_1$ and $m_2$ of the moiré array of shapes, resulting from the convolution of the base and revealer frequencies shown in FIG. 13A.

Let us consider first the simple case where both the base and revealing layer gratings have in the spatial frequency Fourier (u,v) plane only horizontal and vertical frequency vectors of different lengths ("iso-orientation base and revealer layouts"). FIG. 13A shows such a case, with frequency vectors $f_1$ and $f_2$ for the base layer and frequency vectors $g_1$ and $g_2$ for the revealing layer. Therefore base and revealer have the same orientations, but the size of their frequency vectors differs. According to moiré theory, in the image domain the moiré is the multiplication of the base and the revealing layers. In the Fourier domain, the corresponding operation is a convolution operation. Performing the convolution between the base and the revealer given by frequency impulses at frequencies $(f_1, -f_1, f_2, -f_2)$ for the base and $(g_1, -g_1, g_2, -g_2)$ for the revealer consists in performing the vector addition that yields the low moiré frequency vectors $(m_1, -m_1, m_2, -m_2)$, see FIG. 13B. They are obtained as follows:

$$m_1 = f_1 - g_1; m_2 = f_2 - g_2; -m_1 = -f_1 + g_1; -m_2 = -f_2 + g_2 \quad (15)$$

The moiré that appears has also horizontal $m_1$ and vertical $m_2$ frequency vectors, i.e. frequency vectors having the same orientation as the base and revealer frequency vectors ("iso-orientation moiré layout"). The moiré is replicated along the horizontal and vertical axes. Upon horizontal or vertical displacement of the sampling revealer on the base, it also moves horizontally and vertically, respectively. As an example of such as case, consider a fixed compound made of a revealing layer 2D grating of horizontally and vertically laid out microlenses sampling a horizontally and vertically laid out 2D array of tiny shapes. By tilting the compound vertically around the horizontal axis, the revealer samples successive locations located in the vertical direction and the moiré shapes move vertically. By tilting the compound horizontally around the vertical axis, the revealer samples new positions located along the horizontal direction and the moiré shapes move horizontally. This kind of movement is called "intuitive moiré movement".

Figure 14A:
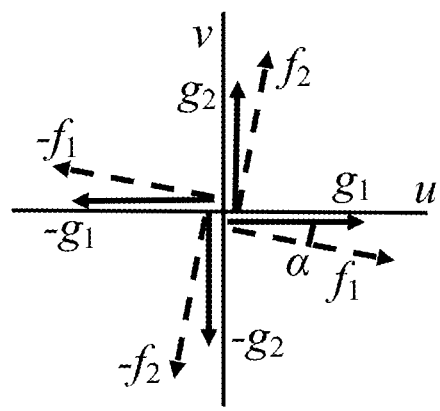
FIG. 14A also shows the fundamental frequencies of the base and revealer arrays, with the base frequency rotated by a small angle $\alpha$ in respect to the horizontal and vertical layout of the revealer.

The more general case is the case where the base and revealing layer gratings have spatial frequency vectors that have a similar length but have slightly different orientations (e.g. FIG. 14A, where the orientation differs by small angle α). In such a case, by performing the same vector additions as in the previous case (FIG. 13B), one obtains a moiré (FIG. 14B) whose frequency components are rotated by nearly 90 degree in respect to the previous horizontal-vertical moiré layout case (compare the $m_1$ and $m_2$ moiré frequency vectors in FIG. 13B and in FIG. 14B). Therefore, tilting the compound vertically around the horizontal axis moves the moiré along a direction close to the horizontal axis ($m_2=f_2-g_2$) and tilting the compound horizontally around the vertical axis will move the moiré along a direction close to the vertical axis ($m_1=f_1-g_1$). This kind of movement is called "counter-intuitive moiré movement".

Combined 2D and Level-Line Moiré: Iso-Orientation Layouts of Base, Revealer and Moiré

Let us describe the operations necessary to create a 2D-LL moiré that both moves and shows a beating effect. We consider first the simpler case of base and revealer having frequency vectors of the same angular orientation (iso-orientation base, revealer and moiré layouts, here horizontal and vertical orientations). Tilting a compound made of such a base and revealer yields an intuitive moiré movement.

1. Define a "Height map" (FIG. 15, 1501) that has the same layout as the desired final 2D-LL moiré, together with its replication (or displacement) vectors $v_{m1}$ and $v_{m2}$.
2. Define the horizontal and vertical periods $T_{rx}$ and $T_{ry}$ of the revealing layer sampling grating appropriate for the final application. In case of the same repetition period horizontally and vertically, we have $T_{rx}=T_{ry}=T_r$.
3. Calculate according to formula (12) the base tile 1502 replication vectors $v_{b1}$ and $v_{b2}$.
4. Traverse one tile of the 2D base elevation profile space (1502) and by applying the transformation mapping base layer positions to moiré positions (according to formula (13)), create one tile 1502 of the 2D base elevation profile as well as its replicas 1512.
5. Define the concept of one column of a "Grating of gradients" formed by a grating of intensity wedges (or by replicated gradients 1503, 1513) having a vertical repetition period $T_g$ preferably equal to the revealer period $T_{ry}$ or revealer period $T_r$ in case of the same repetition period horizontally and vertically. There is no necessity to create a byte map with this grating of gradients. It is sufficient to obtain the current normalized intensity P at a given position (x,y) of this grating of gradients by performing the operation: $P=(y \mod T_g)/T_g$.
6. Assuming normalized intensity levels, create one column of a "2D-LL modified base" (1504, 1505) by summing modulo-1 (1509) each pixel intensity of the 2D base elevation profile 1502 with each corresponding pixel intensity of the grating of gradients (1503, 1513).
7. Replicate the single column of the "2D-LL modified base column" into the 2D-LL modified base 1508 covering the full space of the moiré. In FIG. 15, this vertical column is replicated horizontally.
8. If the modified base needs to be binary, for example in case it is formed by the presence or absence of a metallic layer, then halftoning is recommended. In that case it is advisable to halftone the 2D-LL modified base 1508 (enlarged: 1506, 1507) for example by dithering with a dither matrix as described in the Section "Combined 2D and level-line moiré: freely chosen layout". FIG. 18B shows a halftone element etched into an aluminium layer, where the halftoning operation is performed by dithering with the dither matrix shown in FIG. 18C.
9. Observe that in the 2D-LL modified base 1508, tiles showing the Euro sign have different gray level distributions at different vertical positions but the same gray level distribution along the same horizontal positions; see for example extracts at different vertical positions 1506 and 1507 of the 2D-LL modified base 1508. A compound made of a revealing layer forming a 2D grating of sampling microlenses superposed with the 2D-LL modified base creates a moiré shape that moves in the horizontal direction but does not show changing gray levels when tilting the compound horizontally around the vertical axis (FIG. 16A). But when tilted vertically around the horizontal axis, the revealer samples successively different vertical locations and the moiré moves vertically and at the same time shows a beating effect induced by the changes in intensity levels (FIG. 16B).

FIGS. 16A and 16B show photographs of the moiré produced by a compound that comprises a horizontally and vertically laid out revealer grating of lenses having a horizontal and vertical repetition period of $T_r$=192.6 µm. The horizontally and vertically laid out base layer tiles of the compound, patterned by metal, have a horizontal $T_{bx}$ and vertical $T_{by}$ base layer period $T_{bx}=T_{by}$=188 µm.

Combined 2D and Level-Line moiré: Freely Chosen Layout

Figure 14B:
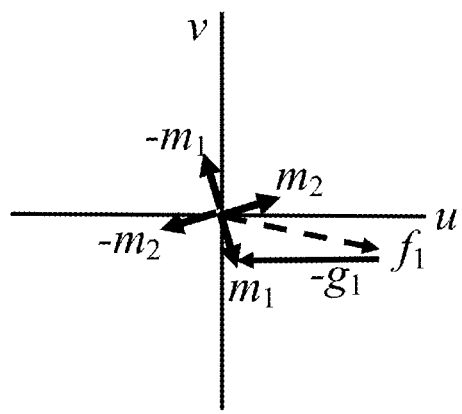
FIG. 14B shows the fundamental frequencies of the moiré that is obtained by the convolution of the base and revealer of FIG. 14A.

Let us show how to create a moiré combining 2D and level-line moiré that moves in an non-intuitive way when tilting a compound incorporating such as base and revealer. As illustrated in FIG. 14B, one needs to select a moiré layout given by the moiré frequency vectors $m_1$ and $m_2$ which depend on the frequencies and orientations of base (frequency vectors $f_1=(f_{1x}, f_{1y})$, $f_2=(f_{2x}, f_{2y})$) and revealer (frequency vectors $g_{1x}=(g_{1x}, g_{1y})$, $g_2=(g_{2x}, g_{2y})$). The goal is to obtain a moiré frequency vector $m_1$ having an orientation close to the vertical axis and a frequency vector $m_2$ having an orientation close to the horizontal axis. This is achieved by finding a solution to Equation (15). Without loss of generality, it is possible to find a mapping where revealer frequency vectors ($g_1$, $g_2$) are horizontal and vertical and where the base frequency vectors $f_1$, $f_2$ are oblique (FIGS. 14A and 14B). The resulting moiré frequency vectors ensure that a horizontal tilt of a compound incorporating these base and revealing layers yields a moiré moving in the near vertical direction (FIG. 14B: direction of $m_1$ and $-m_1$) and that a vertical tilt of the compound yields a moiré moving in the near horizontal direction (direction of $m_2$ and $-m_2$). These kinds of moiré movements are counter-intuitive. The steps to create such a moiré are the following:

1. Define the base, revealer and moiré frequency vectors $(f_1,f_2)$, $(g_1, g_2)$ and $(m_1, m_2)$ that fulfill equation (15), with preferably the additional constraint of having horizontal and vertical revealing layer frequency vectors (FIG. 14A, vectors $g_1, g_2$). This means that the revealing layer grating of microlenses is laid out along horizontal and vertical orientations. Its horizontal and vertical period are $T_{rx}=1/g_{1x}$ and $T_{ry}=1/g_{2y}$.

2. With the moiré frequency vectors ($m_1$, $m_2$), calculate the moiré period vectors ($v_{m1}$, $v_{m2}$) according to Section "Obtaining period vectors from frequency vectors".

3. Define the height map (FIG. 17, 1701) within the space spanned by the two moiré period vectors $v_{m1}$ and $v_{m2}$. These period vectors define the displacement of the moiré upon tilting the compound incorporating the base and revealing layers.

4. With the base layer frequency vectors ($f_1$,$f_2$), calculate the corresponding base period vectors (also called replication vectors) ($v_{b1}$, $v_{b2}$) according to section "Obtaining period vectors from frequency vectors".

5. With the revealing layer frequency vectors ($g_1$, $g_2$), calculate the corresponding revealing layer period vectors (also called replication vectors) ($v_{r1}$, $v_{r2}$) according to section "Obtaining period vectors from frequency vectors".

In order to map the height map (FIG. 17, 1701) onto one tile of the 2D base elevation profile 1702, the surface of such a base elevation tile is traversed pixel by pixel, each pixel location is transformed (i.e. mapped) into a height map location, its intensity or color value is found and copied to the current base elevation tile pixel. The base to height map linear transformation coefficients $b_{11}$, $b_{12}$, $b_{21}$ and $b_{22}$, are obtained by formula (6), see section "Linear transformation from base layer space to moiré layer space. This transformation maps the base elevation replication vectors ($v_{b1}$, $v_{b2}$) onto the height map specified by period vectors $v_{m1}$ and $v_{m2}$. It comprises a scaling and a rotation operation. Some of the replicated base elevation tiles are shown in 1711 and 1712.

6. Define the "Grating of gradients" 1703 (enlarged: 1713), having the same orientation as the revealing layer and having a repetition period $T_g$ preferably equal to the vertical revealer periods $T_{ry}$, obtained by the inverse of the vertical revealer frequency $|g_2|$, i.e. $T_g=T_{ry}=1/g_{2y}$, see FIG. 14A.

7. Assuming normalized intensity levels of the 2D base elevation profile and of the 2D LL gradient base, create the "2D-LL modified base" (1708) by summing modulo-1 (1709) each pixel of the 2D base elevation profile 1702 with each corresponding pixel of the grating of gradients 1703 (enlarged: 1713).

Halftoning is recommended in case that the base layer is made of binary elements, for example the presence or absence of metal. In order to obtain a nice distribution of intensity levels within the moiré, it is advisable to halftone the 2D-LL modified base 1708, for example by applying a dithering operation to the variable intensity 2D-LL modified base (see enlargement 1706, 1707). FIG. 18A shows a part of a halftoned 2D-LL modified base patterned (e.g. by etching) into an aluminium layer. FIG. 18B shows an enlargement of one of the symbols of FIG. 18A. The dithering operation is performed with the dither matrix shown in FIG. 18C.

Figure 19A:
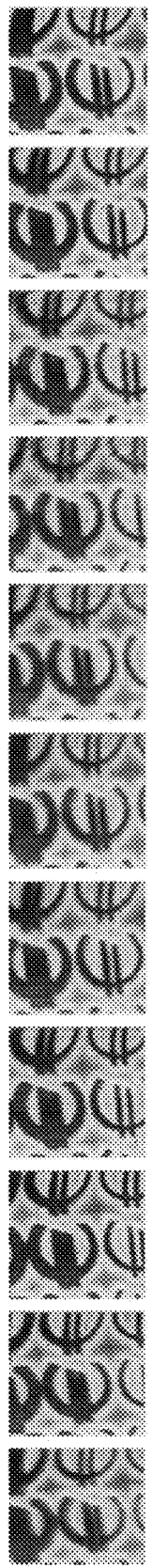
FIG. 19A shows for a compound having a base layer with slightly rotated fundamental frequencies in respect to the revealing layer frequencies that upon a horizontal tilt, the moiré moves vertically without a significant change in intensities.

A compound made of a revealing layer forming a 2D grating of sampling microlenses superposed with the halftoned 2D-LL modified base whose respective frequency vectors ($g_1$, $g_2$) and ($f_1$,$f_2$) have a slightly different orientation (as shown in FIG. 14A) induce a moiré whose frequencies ($m_1$, $m_2$) are nearly perpendicular to the frequencies ($f_1$,$f_2$) present in the base (FIG. 14B, near 90 degrees angle between $f_1$ and $m_1$). Therefore, when tilting the compound horizontally around the vertical axis, the sampling revealer samples increasing or decreasing horizontal positions and the resulting moiré moves along the near vertical direction ($m_1$ or $-m_1$), which is counter-intuitive. FIG. 19A show this horizontal tilt movement for tilt angles between $-25$ degrees to $+25$ degrees, and the corresponding photographs of the moiré. From one angle to the next, the "Euro" moiré displaces itself towards the top and the Euro symbol keeps the same intensity values at the different tilt angles.

Figure 19B:
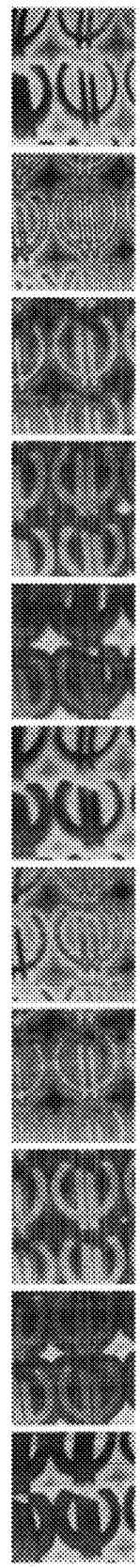
FIG. 19B shows for the same compound as in FIG. 19A that upon a vertical tilt the moiré moves horizontally and significant changes in intensities occur, but the original moiré shape remains recognizable.

In contrast, when tilting the compound vertically around the horizontal axis, the revealer samples increasing or decreasing vertical positions and the resulting moiré moves along the near horizontal direction ($m_2$ or $-m_2$), which is also counter-intuitive. FIG. 19B show this vertical tilt movement for angles between $-25$ degrees to $+25$ degrees, and the corresponding photographs of the moiré. From one angle to the next, the "Euro" moiré displaces itself towards the left. At each angle, the Euro symbol changes its intensity values according to the circular intensity shift described in FIGS. 8A to 8F.

The compound that creates the moirés shown as photographs in FIGS. 19A and 19B is formed by a horizontally and vertically laid out revealing layer grating of lenslets having repetition periods $T_{rx}=T_{ry}=T_r=192.6$ μm. The base layer tiles of the compound patterned by metal have also a square layout with a horizontal $T_{bx}$ and vertical $T_{by}$ base layer period $T_{bx}=T_{by}=192.5$ μm. The square base layer tiles are rotated by $\alpha=1.47$ degrees in respect to the horizontally and vertically laid out revealing layer.

Curvilinear Combined 2D and Level-Line Moiré

The creation of 2D-LL moirés following a curvilinear trajectory requires in addition to the steps enumerated previously for synthesizing rectilinear 2D-LL the following elements.

Figure 17:
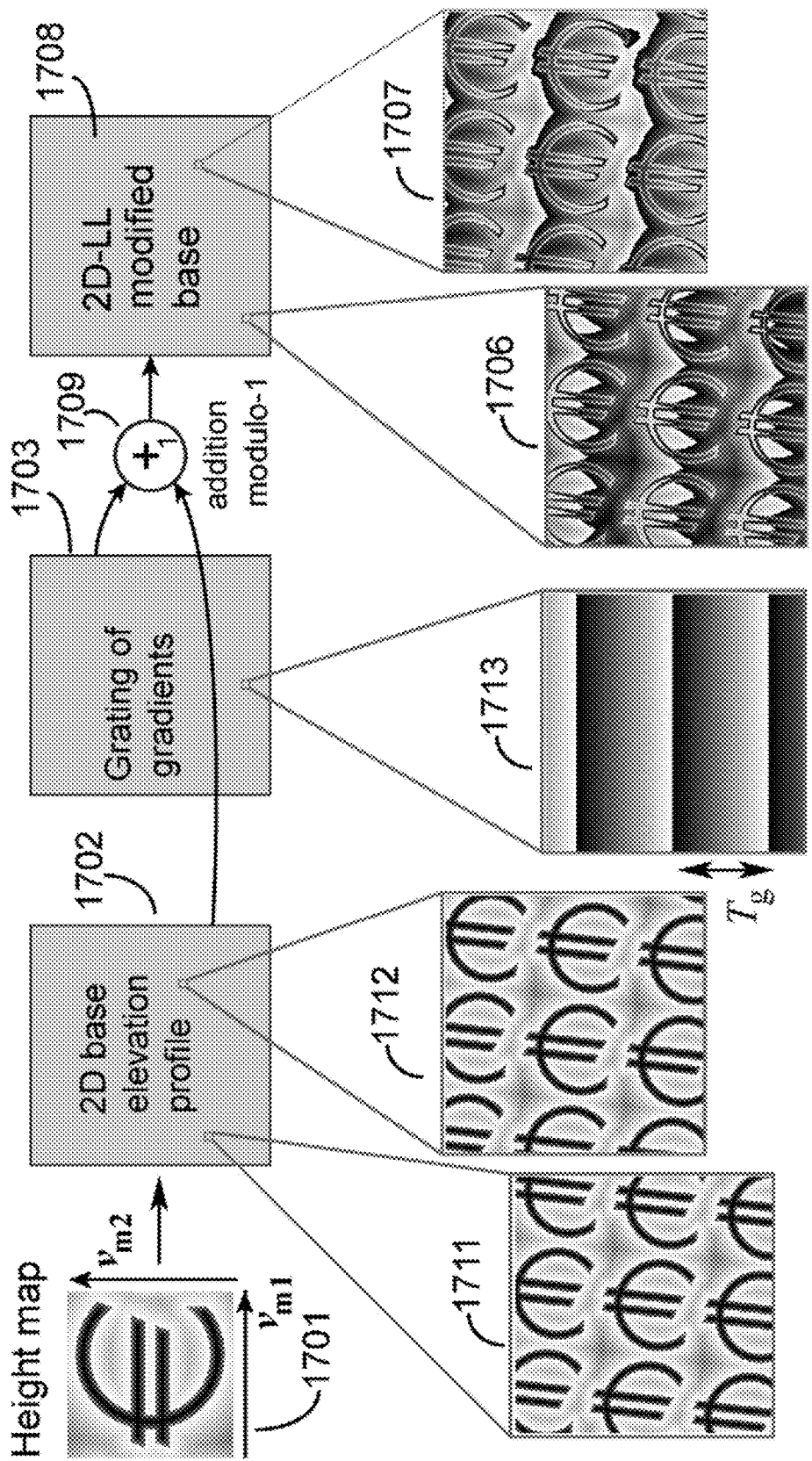
FIG. 17 shows a schematic view of the data representations and the processing operations to create the modified base layer for the 2D-LL moiré with a base layer having the slightly oblique fundamental frequency vectors shown in FIG. 14A.

The moiré designer needs to specify a geometric transformation $M(x_t,y_t)=(m_x(x_t,y_t), m_y(x_t,y_t))$ mapping the layout of the desired curvilinear 2D moiré into a rectilinear height map, as the ones shown in FIG. 15 or 17. From this moiré transformation and the transformation $G(x_t,y_t)=(g_x(x_t,y_t), g_y(x_t,y_t))$ that is applied to obtain a curvilinear revealing layer, according to Equation (14), one obtains the transformation $H(x_t,y_t)=(h_x(x_t,y_t), h_y(x_t,y_t))$ to be applied to obtain the curvilinear 2D-LL modified base layer. In a preferred embodiment, the revealer is rectilinear, i.e. the transformation $G(x_t,y_t)$ is the identity transformation, with $x=x_t$ and $y=y_t$.

By scanning the curvilinear 2D-LL modified base layer $(x_t,y_t)$ at successive $x_t$ and $y_t$ coordinates, scanline by scanline, the computer program finds according to transformation $H(x_t,y_t)$ the corresponding locations $(x'', y'')$ within the rectilinear 2D-LL base layer, reads at that location the intensity or color and copies it back into the current curvilinear modified base layer coordinate $(x_t,y_t)$. This enables creating the corresponding curvilinear 2D-LL base layer array of tiny shapes. When superposed with the revealing layer specified by transformation $G(x_t,y_t)$, it generates the moiré that is specified by the moiré transformation $M(x_t,y_t)$. In the same manner as in the case of a rectilinear 2D-LL moiré, tilting the device in one direction creates a movement without change of intensities and tilting the device in the other direction creates a movement with a change of intensities, but keeps the moiré shape motif intact.

Embodiments of Base and Revealer for Producing 1D-LL or 2D-LL Moirés

A compound formed by a revealing layer superposed with a modified base layer can be realized in various ways.

Let us consider first a reflective compound, i.e. a compound where the incident light hits the compound on the front side. In a reflective compound, the modified base layer substrate is diffusely reflecting. The base patterns or shapes can be printed, for example by ink-jet, by gravure, or by offset on the reflecting medium (e.g. paper or opaque white plastic). The revealer can be formed by a film comprising a grating of transparent lines on a black background. Alternately, the revealer can be formed by an array of cylindrical lenslets in case of a 1D-LL moiré or of an array of aspherical or spherical lenslets in case of a 2D-LL moiré. Finally, it is also possible to realize a reflective device by having a metallic layer covering the surface parts that are either the "white" or the "black" areas of the halftoned 1D-LL or 2D-LL modified base layer (e.g. the "white" areas in FIG. 18B). In order to create a high contrast in the base, the areas not covered by the metallic layer can be formed by a black substrate material (plastic or deposition of dark matter). Due to the high resolution offered by laser lithography, higher base frequencies can be achieved with metallic deposition than those achievable by printing. It is also possible to create a reflective compound by using a transparent substrate with a metallic layer covering the surface parts that need to reflect the light, e.g. the "white" areas in FIG. 18B.

As a further embodiment of a modified base, one may fabricate by laser cutting a metallic plate with holes, where the metallic parts are e.g. the "halftoned black" parts that reflect the light and the holes e.g. the halftone white parts that let the light pass through without reflecting. Thin metallic connections ensure that metallic parts surrounded by holes are connected to the other metallic parts.

Regarding a transmissive compound, i.e. a compound where light comes from behind the compound, the same variants are available as for the reflective compound, but with the difference that the base substrate must be transmissive, e.g. a transparent plastic substrate. The base layer patterns or shapes (e.g. the "white" or the "black" areas in FIG. 18) are absorbing e.g. when printed with a dark ink or are reflecting, when e.g. patterned with a metallic layer.

Figure 20:
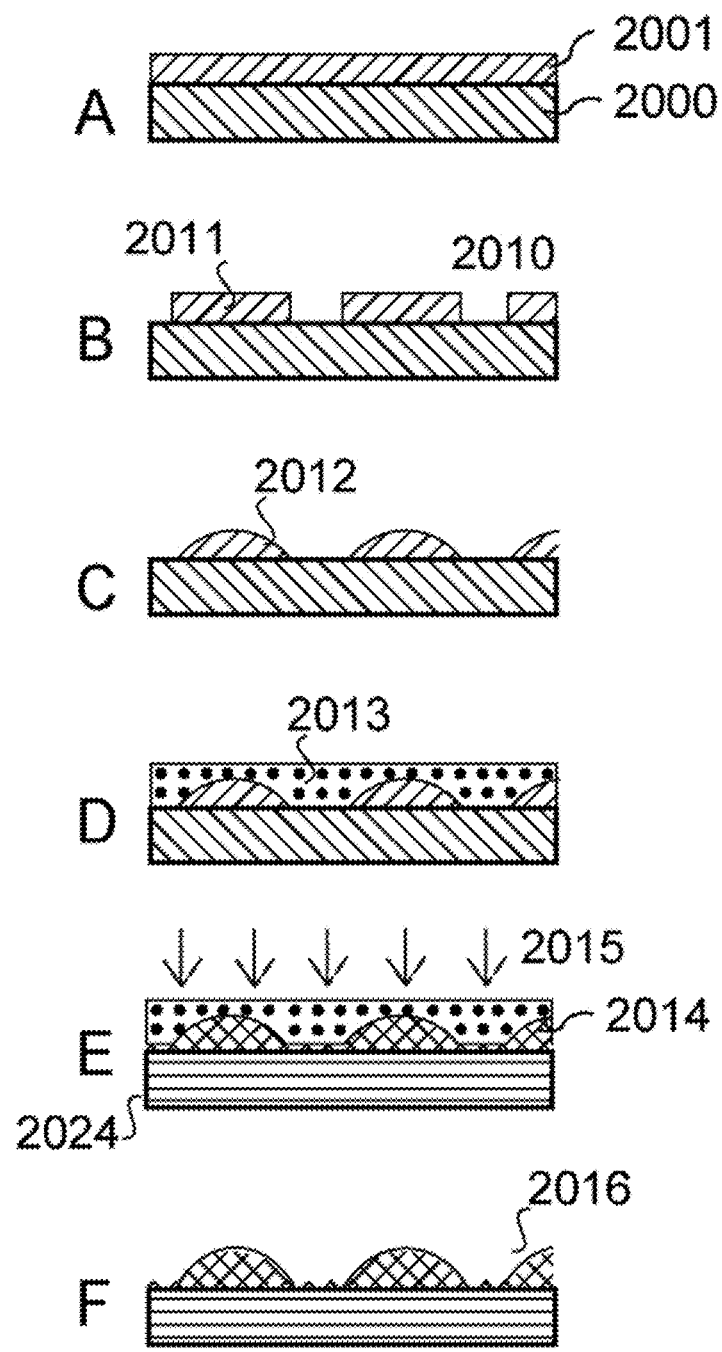
FIG. 20 shows an example of the steps to be carried out for the fabrication of an array of cylindrical or spherical lenslets.

A further embodiment of a transmissive compound can be realized with small cylindrical lenses covering the "black halftone" areas of the modified halftoned base, and either no lenses or small randomly sized spherical lenses cover the "white halftone" areas of the modified halftoned base. This embodiment is explained in detail in patent U.S. Pat. No. 10,286,716, Section "Creating 2D moirés with the multi-lenslet imaging setup", with reference to FIG. 20B of that patent. This same method of creating transparent moirés by lenslets only can also be applied to create the modified bases of the present invention. Upon tilting the compound, the resulting moving and beating moiré will move in the same manner as the transmissive 1D or 2D moiré of U.S. Pat. No. 10,286,716, but will show in addition an evolution of intensities and colors that depend on the intensities and colors of the light incident on the compound at different angles.

Calculating the Radius of Curvature of the Sampling Lenslets

Figure 21:
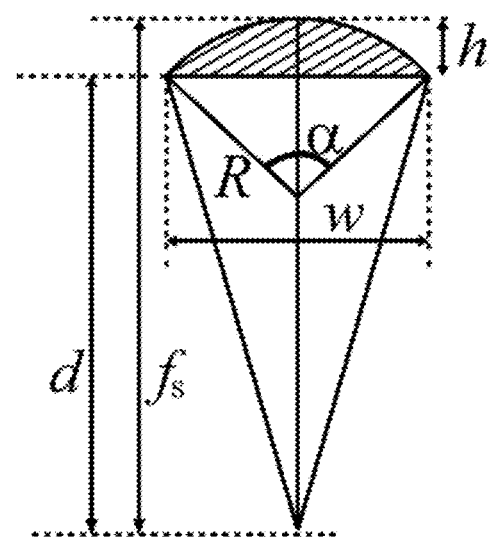
FIG. 21 shows a section through a cylindrical or spherical lenslet with the lens curvature radius R, the width w, the sag-height h, the angular field of view $\alpha$, the nominal focal length $f_s$ and the substrate thickness d.

The revealing layer lens array samples the underlying modified base layer. The optimal distance between lens top and base layer is the nominal focal length (FIG. 21, $f_s$) of the lens, see [Walger et al. 2019] and [Walger et al. 2020]. The parameters (FIG. 21) defining the revealing layer lenslets are the repetition period (pitch) $T_r$, the width of the cylindrical or spherical lenslet w, their sag-height h and their nominal focal length $f_s$ as well as the substrate thickness d. These lens parameters can be calculated by considering a section of a generic lenslet, see FIG. 21. The following relationships enable calculating the lenslet radius. By relying on the geometry of FIG. 21

$$(R-h)^2 = R^2 - \left(\frac{w}{2}\right)^2 \tag{13}$$

By developing (13) in order to express the lens curvature radius R as a function of the lens width w and the cap-height h, we obtain $$R = \frac{w^2}{8h} + \frac{h}{2} \tag{14}$$

The focal length $f_s$ within the lens medium is defined by the well-known relationship (Hecht, Optics, Chapter 5, formula 5.10):

$$f_s = R_r \frac{n_{lens}}{n_{lens} - n_m} \tag{15}$$

where $n_{lens}$ is the index of refraction of the lens material (for plastic: $n_{lens}$=1.5) and $n_m$ is the index of refraction of the surrounding medium, in the case of air, $n_m$=1. The relation between focal length $f_s$, lenslet substrate thickness d and the sag-height h is the following:

$$h = f_s - d \tag{16}$$

In many cases, input parameters are the substrate thickness d and the lenslet width w, which is preferably made equal to the lens repetition period $T_r$. With equations (14), (15) and (16), and by the change of variables $m=n_{lens}/(n_{lens}-n_m)$ we obtain the following relation between lens radius R, substrate thickness d and lens width w:

$$R^2 \cdot 4m(m-2) + R \cdot 8d(1-m) + w^2 + 4d^2 = 0 \tag{17}$$

The solution for radius R is:

$$R = \frac{-b - \sqrt{b^2 - 4ac}}{2a} \text{ with } \begin{aligned} a &= 4m^2 - 8m \\ b &= 8d(1-m) \\ c &= w^2 + 4d^2 \end{aligned} \tag{18}$$

Note that it is also possible to have a substrate thickness d' smaller than $f_s$–h. Starting with a given optimal solution for the radius R and the substrate thickness d, one may decide to have a flatter lens with a larger radius R' and a larger focal length f'. Or one may, starting from the optimal solution, decide to have a smaller substrate thickness d', e.g. reduced to 70% of the original size. In both cases, the effect will be a slight blur of the resulting moiré.

After having calculated the curvature radius R of the cylindrical or spherical lenslets, one can fabricate the lenslets by a reflow technique, as described in the next section. One can also create a mould having the right shape, i.e. the negative of a 1D array of cylindrical lenslets having a circular profile of radius R or the negative of a 2D array of spherical lenslets having a spherical profile of radius R. One can also convert the 1D array of cylindrical lenslets or the 2D array of spherical or aspherical lenslets into a surface mesh, that serves as input data to a 3D printer that will print the revealing layer and possibly also the base layer to form a same compound.

Fabrication of the Base and Revealing Layers for 1D-LL or 2D-LL Moirés

Both base and revealing layers can be created on film with a filmsetter or imagesetter. In case of a transparent substrate, the filmsetter illuminates the parts of the base that are represented by "black" (see FIG. 18A or 18B, "black" parts are absorbing) and leaves the parts of the transparent film that are transparent (FIG. 18A or 18B, "white" parts), or vice-versa. In case of a revealing layer formed by a grating of transparent lines, the non-transparent parts are absorbing the light. In case of a revealing layer formed by lenslets, one can apply the fabrication methods described in U.S. Pat. No. 10,286,716, Section "Fabrication of gratings of cylindrical lenslets".

One of these lenslet fabrication methods relies on the reflow of positive resist, see [Daly et al. 1990]. The gratings of cylindrical lenslets are fabricated by spin coating the positive resist, by laser writing and by reflow. The arrays are replicated in PDMS and finally used for UV imprint with photocurable polymer. At the end of the process, a further step can be executed for the encapsulation of the device. As an example, the different steps are shown as cross-sections in FIG. 20.

A. Positive resist 2001 is spin coated on a silicon wafer (2000).
B. The resist is exposed and developed (2010) so as to yield either longitudinal stripes 2011 following the centerlines of the cylindrical lenslets (for 1D-LL moirés) or tiny horizontally laid out disks (for 2D-LL moirés).
C. The structured resist is heated and becomes liquid. This reflow process tends to create, due to surface tension, lenslets whose cross sections are circular segments (2012).
D. In order to create the molds, Polydimethylsiloxane (PDMS, e.g. Sylgard 184) 2013 mixed with a curing agent is placed on top of the reflowed resist structures. It is heated to around 80° C. during at least one hour so as to fully polymerize. The PDMS is removed from the silicon substrate and now holds the negative shape of the cylindrical or spherical lenslets.
E. The PDMS is then placed on top of a suitable substrate (e.g. glass or plastic sheet 2024) on which UV curable material 2014 such as Ormocomp was deposited. The UV curable material spreads out under the PDMS. It is then exposed from below or from the top by a UV light source 2015. The PDMS mold is released and the grating of cylindrical lenslets 2016 is available, bound to its substrate.

The reflow method mentioned above can be extended for mass production by using the molds created in step D above and attaching them to a rotating belt encircling a rolling wheel. For the mass production of the revealing layer, the rolling wheel rotates, curable material such as Ormocomp is deposited and pressed into the PDMS molds. This material is then cured by UV illumination.

Regarding the fabrication of the base layer, a large film or imagesetters can produce at once many base layer film samples. Alternately, base layer samples can also be printed. In case of a base layer made of metallic parts, lithography-based techniques can be applied to remove by etching surface elements of the metallic layer deposited on a plastic or glass substrate. Alternately a method called lift-off can be used to obtain the metallic patterns on a transparent substrate. This process starts by creating the photo-resist structures, then depositing the metal through them before finally removing the photo-resist and all the metallic parts that are not in direct contact with the substrate.

Compounds comprising lenslet gratings on top of a base may be manufactured by 3D printing with a plastic material. The 3D shape of the transparent lenslet gratings together with its partly non-absorbing and partly absorbing base layer parts is described by a surface model such as the wavefront ".obj" format. This surface description is entered into the software converting the surface model to printer commands specifying the x-y horizontal displacements and the z vertical displacements of the 3D print head. The resulting printed 3D plastic element incorporates the revealing layer lenslet grating on top of the plastic base layer. In case of reflection moirés, the plastic base layer comprises diffusely reflecting and as well as absorbing parts. In case of transmissive moirés, the base layer comprises transparent and absorbing parts.

The resulting printed 3D volume compound is directly usable to view and authenticate the moiré image. Such a compound can be attached to or incorporated into documents or products that need to be authenticated.

Verification of the Authenticity of the Moiré Compound

Figure 22:
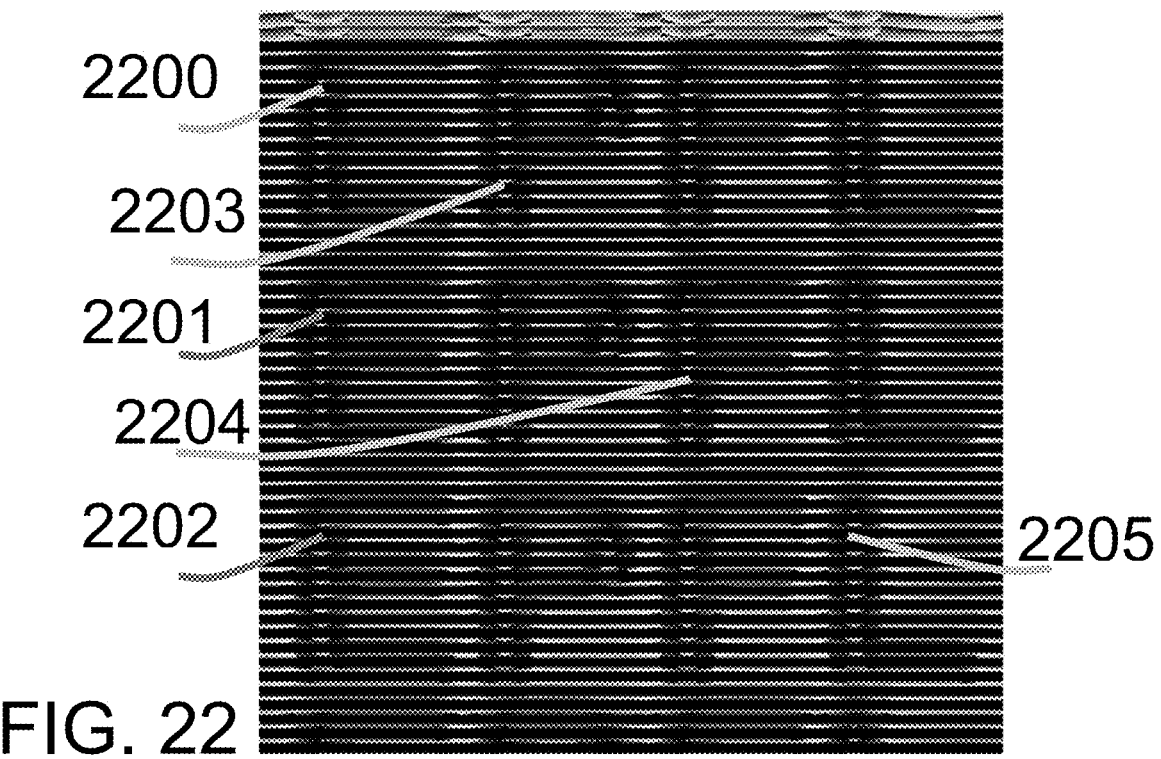
FIG. 22 shows original moiré shapes that are authentic since similar letter parts have similar intensity profiles.
Figure 23:
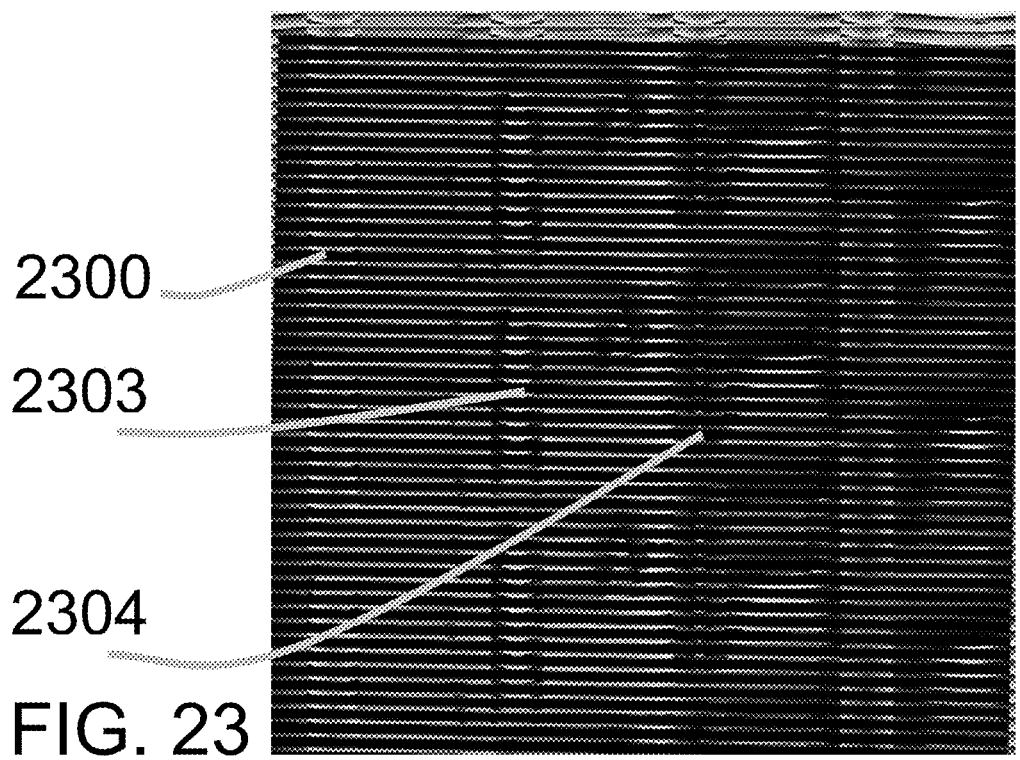
FIG. 23 shows the moiré shapes produced by a small rotational misregistration error between base and revealer, yielding some letters with a loss of contrast and destroying other letters.
Figure 24:
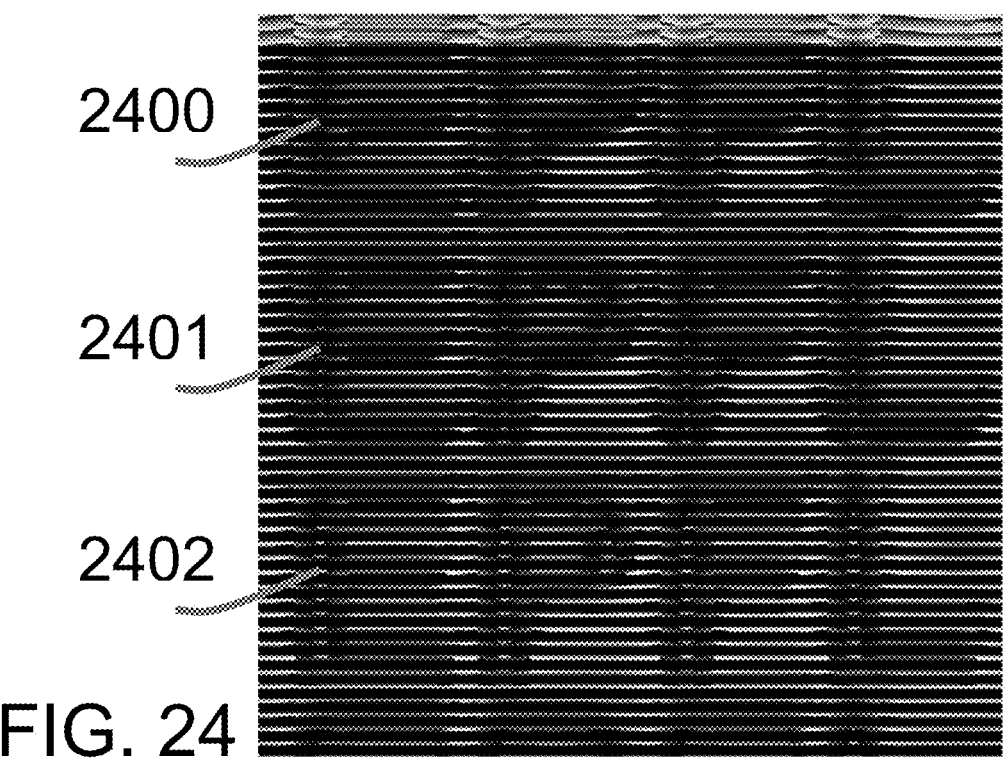
FIG. 24 shows the moiré shapes produced with a small scaling error between base and revealer, yielding differences in intensity profiles on parts of letters that should remain identical.

Counterfeiters do not have at their disposable the professional tools to reproduce very faithfully existing moiré shapes. Their fake moirés will have certain alignment errors between base and revealer, such as a small undesired rotation and/or a small scaling error. FIGS. 22, 23 and 24 illustrate how the moiré shapes get distorted upon a small rotation or scale error between the base and the revealer. FIG. 22 shows authentic moiré shapes. All center lines 2200 to 2205 which have similar elevation profiles appear at the same intensity. FIG. 23 shows the same base and revealing layers, but having a small rotational misregistration error of 1.1 degrees. The consequences are immediately apparent. Letters "E", "F", and "L" are destroyed or severely distorted. In addition, the centers of the letters 2300, 2303, 2304 have completely different intensities. FIG. 24 shows the same base and revealing layers, but this time having a small scaling error where the revealer is 0.3% vertically smaller than it should be. Due to this very small scaling error, the centers of the letter strokes 2400, 2401, 2402 have completely different intensities.

This shows that even on a low resolution example (300 dpi), small rotational and scaling errors can lead to strong deformations of the moiré shapes as well as to undesired modifications of their intensity profiles. At higher resolutions of 2400, 4800 or 9600 dpi, and at a size of 0.8 cm by 0.8 cm, identical, 2 times smaller or even 4 times smaller rotational and/or scaling errors, respectively, will produce the distorted moiré shapes shown in FIG. 23 and FIG. 24.

The verification of the correctness of the moiré shape as well as the identification of the presence of constant intensities on similar parts of the different letters can be performed by a human observer. When tilting the compound showing the moiré shape, one can also verify both the movement of the moiré and the changes in intensity profiles at the different parts of the moiré shape and check that they are consistent, i.e. that similar intensities are present on parts of the moiré shape that have a similar elevation. In addition, one can verify that despite the change in intensities of the different parts of the moving moiré shape, on can still recognize the presence of a same moiré shape. For example FIG. 19B shows very different spatial distributions of intensity levels at different tilt angles, and at the same time also shows that at these different tilt angles, the same "Euro" moiré shape is visible and recognizable.

This kind of verification can also be performed by acquisition with a camera and with a computing system such as a smartphone running authentication software operable for comparing the movement of the actual moiré with "authentic" moiré movements and the intensities of the moiré shapes with "authentic" intensities. An "authentic" moiré movement is a movement that does not significantly change the predefined size and orientation of the moiré. An "authentic" change of moiré intensities is a change that preserves within a single moiré shape similar moiré intensities on areas of the moiré shape that have a similar elevation profile, for example the centerline of the moiré character shape. An "authentic" change of moiré intensities also preserves the overall moiré shape.

Placement of the Moving and Beating Moiré Compound onto Valuable Documents and Products The moiré compound incorporating on its recto the revealing layer grating of lenslets and on its verso the base layer gratings can be made part of a security document such as an ID card by fabricating the revealing layer grating of lenslets on the top of the card substrate and the base layer grating on the bottom of the card substrate. The card substrate can be transparent or semi-transparent. The base layer grating can incorporate absorbing and transparent areas or reflecting and transparent areas. In both cases, the authenticity of the ID card can be checked in transmissive and in reflective mode. The verification is carried out by tilting the ID card and verifying that the moiré shapes do not get distorted and that at any tilt angle, similar parts of the moiré shapes, e.g. the centerlines of the letters have a similar intensity profile. The revealing layer lenslet grating can further be protected by encapsulating it into a polymer with a lower index of refraction than the index of refraction of the lenslets.

The setup with the moving and beating moiré compound can also be applied on any package of a valuable good for its authentication. For example, a package containing drugs may incorporate the moiré compound. When tilting the package, the moving and beating moiré appears and the observer can verify the that the moiré displacement does not distort the moiré shapes and that the change of intensities within the moiré shapes is consistent between the different shapes parts, for example the centerlines of the letter shapes.

The moiré compound may also be incorporated on separate security labels or stickers that are affixed or otherwise attached to the product itself or to the package. The moiré compound can also be made part of a banknote having a section with a transparent plastic substrate, by having the base patterned on one side of the banknote and the revealer lenslets formed on the other side of the banknote.

Documents and products on which or in which a moiré compound can be attached, fixed or integrated are the following: (a) government documents such as passports, ID cards, driver's licenses, visas, birth certificates, social security cards, bonds, postage stamps, and tax stamps; (b) credit cards, debit cards, gift cards, bank cards; (c) documents such as licenses, diplomas, and certificates; (d) financial instruments such as bank checks, personal checks, bank vouchers, stock certificates, traveller checks; (e) branded products such as drinks, perfumes, cosmetics, fragrances, pharmaceuticals; (f) equipment such as medical apparatus, electronic equipment, computers, smartphones; (g) jewellery and watches; (h) handbags; (i) art; (j) vehicles and toys; (k) labels, hangtags, tags, threads, tear strips, over-wraps.

Advantages of the Present Invention

The present invention offers a higher protection against counterfeits compared with the prior art described in U.S. Pat. No. 6,249,588 (2D moiré). U.S. Pat. No. 7,710,551 (1D moiré), U.S. Pat. No. 7,305,105 (level line moiré) and U.S. Pat. No. 10,286,716 (two layers of lenslets). The moving and beating moiré produced by combining 1D and level-line moiré or 2D and level-line moiré shows simultaneously the moving effect present in 1D or 2D moirés and the beating effect present in level-line moirés. The beating effect is obtained by the circular shift of intensity values when tilting the moiré compound around the horizontal or vertical axis. A further feature of the moiré moving and beating effect is that despite the change in intensity levels, the moiré shape remains the same and remains recognizable by a human observer or by a computing system, see FIG. 16B and FIG. 19B for the 2D-LL moving and beating moiré. Therefore, during tilting, the moving moiré shapes remain the same; only their intensities change.

In addition to simultaneously moving and beating moirés, a further verification feature consists in checking that at a fixed tilt angle, similar parts of the moirés shapes exhibit similar intensities. Similar parts of the moiré shapes are defined as parts which have a similar elevation profile.

REFERENCES TO SCIENTIFIC ARTICLES

[Amidror 2009], I. Amidror, The theory of the moiré phenomenon, Vol. 1, Section 4.4, pp. 96-108, p. 466 (2009).

[Chosson and Hersch 2014] "S. Chosson, R. D. Hersch, Beating Shapes Relying on Moiré Level Lines, ACM Transactions on Graphics (TOG), Vol. 34 No. 1, November 2014, Article No. 9, 1-10.

[Chosson 2006] S. Chosson, PhD thesis "Synthèse d'images moiré" (in English: Synthesis of moiré images), EPFL Thesis 3434, 2006, relevant pages: pp. 57-64, 111-112.

[Daly et al. 1990] D. Daly, R. F. Stevens, M. C. Hutley, and N. Davies, "The manufacture of microlenses by melting photoresist," Measurement Science and Technology, Vol. 1, 759-766 (1990)

[Hersch and Chosson 2004] R. D. Hersch, S. Chosson, Band Moiré Images, Proc. SIGGRAPH 2004, ACM Trans. on Graphics, Vol. 23, No. 3, 239-248

[Kamal, Völkel & Alda 1998] H. Kamal, R. Völkel, J. Alda, Properties of the moiré magnifiers, Optical Engineering, Vol. 37, No. 11, pp. 3007-3014 (1998).

[Walger et al. 2019] T. Walger, T. Besson, V. Flauraud, R. D. Hersch, and J. Brugger, 1D-moiré shapes by superposed layers of micro-lenses, Optics Express Vol. 27, No. 26, 37419-37434 (2019), published $23^{rd}$ of Dec. 2019, incorporated by reference.

[Walger et al. 2020 Walger; T. Besson; V. Flauraud; R. D. Hersch; J. Brugger, Level-line moirés by superposition of cylindrical microlens gratings, Journal of the Optical Society of America, Vol. A37, num. 2, p. 209-218, published $10^{th}$ of Jan. 2020, incorporated by reference.

The invention claimed is:

1. A method for producing an authenticable moiré shape that simultaneously moves and shows a beating effect, the method comprising steps of:
creating a height map representing a recognizable shape;
creating a base elevation profile comprising an array of replicated base shapes obtained by a linear transformation of said height map;
creating a modified base by performing operations comprising a modulo addition between said base elevation profile and a grating of gradients;
superposing the modified base and a revealing layer formed by a grating of sampling elements;
authenticating a moiré obtained by superposition of the modified base and the revealing layer by verifying that both a movement and a beating of said moiré shape are present, where the beating effect is embodied by moiré shape intensities evolving according to displacements of the revealing layer's sampling locations on top of said modified base, and where despite evolving moiré shape intensities, there remains a contrast at boundaries of the moving moiré shape.

2. The method of claim 1, where after the modulo addition operation, a subsequent halftoning operation ensures that the modified base is a bilevel layer.

3. The method of claim 1, where the moiré shape intensities evolve according to a circular shift.

4. The method of claim 1, where the revealing layer is selected from grating of transparent lines, grating of cylindrical lenslets, grating of transparent dots and grating of spherical or aspherical lenslets.

5. The method of claim 1, where the superposition of the modified base and the revealing layer occurs within a compound having on one side the revealing layer and on the other side the modified base and where the moving and beating moiré shape is observed by tilting the compound.

6. The method of claim 1, where a further authentication step consists in verifying that at a given tilt angle similar elements of the moiré shape have similar intensities.

7. The method of claim 1, where the moiré shape has properties of a 1D moiré which moves only along one dimension, where the base elevation profile is made of an array of base shapes, said base shapes being replicated in one dimension and where the linear transformation of the height map comprises a downscaling operation.

8. The method of claim 1, where the moiré shape has properties of a 2D moiré which moves along two dimensions, where the base elevation profile is made of an array of base shapes replicated in one or two dimensions, where the linear transformation of the height map comprises a downscaling operation and where the movement of the moiré along one dimension does not create a beating effect and the movement in the other dimension creates the beating effect.

9. The method of claim 8, where the linear transformation of the height map also comprises a rotation operation and where fundamental frequency vectors of the base are rotated in respect to fundamental frequency vectors of the revealing layer.

10. A compound for authenticating documents and goods comprising a superposition of a modified base layer and of a revealing layer, where the modified base layer is formed by an array of shapes and the revealing layer by an array of sampling lenslets, where upon tilting of the compound, a moiré shape moves in at least one direction, where while moving, intensity levels of said moiré shape change, yielding within said moiré shape a visible beating effect, and where despite changes of moiré intensity levels, there remains a contrast at boundaries of said moiré shape.

11. The compound of claim 10, where authentication features comprise both movement and the changes of moiré intensity levels while keeping the moiré shape recognizable.

12. The compound of claim 11, where the moiré shape is acquired by a camera and the authentication features are checked by a computing system running authentication software.

13. The compound of claim 10, where the array of shapes within the modified base layer comprises shapes whose intensity profiles are different at different positions within the array.

14. The compound of claim 10, where the modified base layer is obtained by operations applied to a height map representing a shape to be displayed as moiré shape, said operations comprising a downscaling operation and a modulo addition.

15. The compound of claim 10, where upon tilting of the compound in one direction, the moiré shape moves and its intensity levels change and where upon tilting of the compound in perpendicular direction, the moiré shape moves and its intensity levels remain similar.

16. The compound of claim 10, where the modified base layer is a bi-level layer whose foreground, or respectively background parts are patterned by metal and whose background, or respectively foreground parts are transparent, thereby allowing authenticating the compound both in transmission and reflection modes.

17. The compound of claim 10, where said array of shapes are halftoned shapes which are patterned by metal.

18. The compound of claim 10, where the modified base layer is a bi-level layer whose foreground, or respectively background parts are patterned by metal and whose background, or respectively foreground parts are diffusely reflective, thereby allowing authenticating the compound in reflection mode.

19. The compound of claim 10, where upon tilting in a first direction the moiré shape moves in a second direction and its intensity levels do not change and where upon tilting in said second direction, the moiré shape moves in said first direction and its intensity levels change.

20. The compound of claim 10 attached to or incorporated into an item selected from the set of valuable documents comprising identity cards, driver licenses, entry cards, passports, tax stamps, financial instruments, credit cards, debit cards, banknotes, checks, business documents and article labels.

21. The compound of claim 10 attached to or incorporated into an item selected from the set of valuable articles comprising branded products, watches, jewelry, smartphones, computers, vehicles, toys, bottles, packages, pharmaceuticals, drugs and fashion articles.

* * * * *